(12) United States Patent
Hirakawa et al.

(10) Patent No.: US 8,521,215 B2
(45) Date of Patent: Aug. 27, 2013

(54) BASE STATION APPARATUSES, TERMINAL UNIT, RADIO COMMUNICATION SYSTEM HAVING THOSE APPARATUSES, AND PROGRAM TO BE EXECUTED BY THE BASE STATIONS

(75) Inventors: Isao Hirakawa, Osaka (JP); Yongming Liang, Osaka (JP); Waho Oh, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 248 days.

(21) Appl. No.: 13/119,998

(22) PCT Filed: Sep. 17, 2009

(86) PCT No.: PCT/JP2009/066271
§ 371 (c)(1),
(2), (4) Date: May 18, 2011

(87) PCT Pub. No.: WO2010/032791
PCT Pub. Date: Mar. 25, 2010

(65) Prior Publication Data
US 2011/0218016 A1 Sep. 8, 2011

(30) Foreign Application Priority Data

Sep. 22, 2008 (JP) .................................. 2008-242448

(51) Int. Cl.
*H04W 88/08* (2009.01)
(52) U.S. Cl.
USPC ..................... 455/524; 455/562.1; 455/277.1; 342/463
(58) Field of Classification Search
USPC ................ 455/524, 456.5, 464, 67.11, 67.16, 455/552.1, 561, 115.1, 135, 124, 414.1, 458, 455/500, 525, 562.1; 342/463; 370/338, 370/349
See application file for complete search history.

(56) References Cited

U.S. PATENT DOCUMENTS 5,072,222 A * 12/1991 Fockens ........................... 342/44
5,745,532 A * 4/1998 Campana, Jr. ................. 375/347

(Continued)

FOREIGN PATENT DOCUMENTS

| CN | 101227242 A | 7/2008 |
|---|---|---|
| JP | 2007-116686 A | 5/2007 |

OTHER PUBLICATIONS

"A discussion on some technology components for LTE-Advanced," 3GPP TSG-RAN WG1 #53, Kansas City, MO., USA, May 5-9, 2008, R1-082024.

(Continued)

*Primary Examiner* — Tan Trinh
(74) *Attorney, Agent, or Firm* — Birch, Stewart, Kolasch & Birch, LLP

(57) ABSTRACT

The present invention is to enable reduction of constraint brought by generation of ID codes of reference signals to be used for cooperative reception and the allocation of the reference signals when radio communication is carried out between a plurality of base station apparatuses and a terminal unit.

Terminal units UE201 to UE205 are terminal units existing in the cellular zone of a base station apparatus BS200 and are performing communication with base station apparatus UE200. When terminal unit UE201 is located at the edge of cell and its reception characteristic degrades, another base station apparatus, specifically, base station apparatus BS100 also performs cooperative transmission while terminal unit UE201 performs cooperative reception. In this case, in order to demodulate the signal from base station apparatus BS100, an ID code of a reference signal that is different from the reference signal the terminal unit uses to demodulate the signal from a solo base station apparatus is used as the ID code of the reference signal that is transmitted from base station apparatus BS100 and specific to the terminal unit.

18 Claims, 18 Drawing Sheets

(56) References Cited

U.S. PATENT DOCUMENTS

| | | | |
|---|---|---|---|
| 6,127,976 A * | 10/2000 | Boyd et al. | 342/463 |
| 2005/0152319 A1* | 7/2005 | Kubler et al. | 370/338 |
| 2007/0093273 A1* | 4/2007 | Cai | 455/562.1 |

OTHER PUBLICATIONS

"Proposals for LTE-Advanced Technologies," 3GPP TSG RAN WG1 Meeting #53bis, Warsaw, Poland, Jun. 30-Jul. 4, 2008, pp. 2-36, R1-082575.

"Wonderful Exploration of MIMO" (MIMO mysterious exploration), 2006.

3GPP TS 36.211 v8.3.0, May 5-9, 2008.

3GPP TSG RAN WG1#53, Kansas City, MO., USA, May 5-9, 2008, R1-081838.

International Preliminary Report on Patentability for corresponding application PCT/JP2009/066271, dated Apr. 28, 2011.

Kikuma, N., "Adaptive Antenna Technology" (ISBN4-274-03611-1, on pp. 11 to 15), Oct. 10, 2003.

Liang, Yongming, et al. "DOA Based Open-Loop Scheme for Precoding MIMO Systems," Sep. 2, 2008.

* cited by examiner

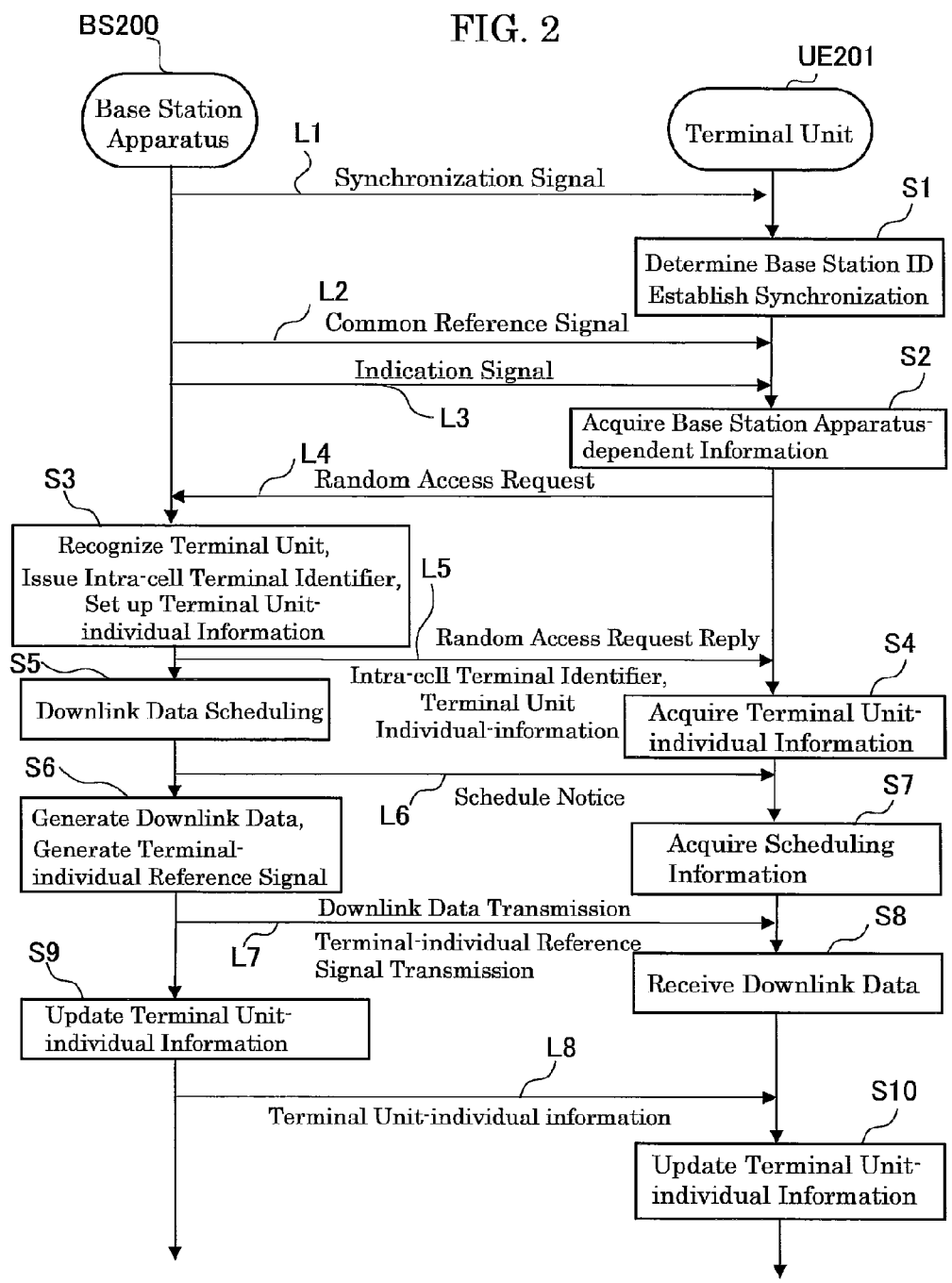

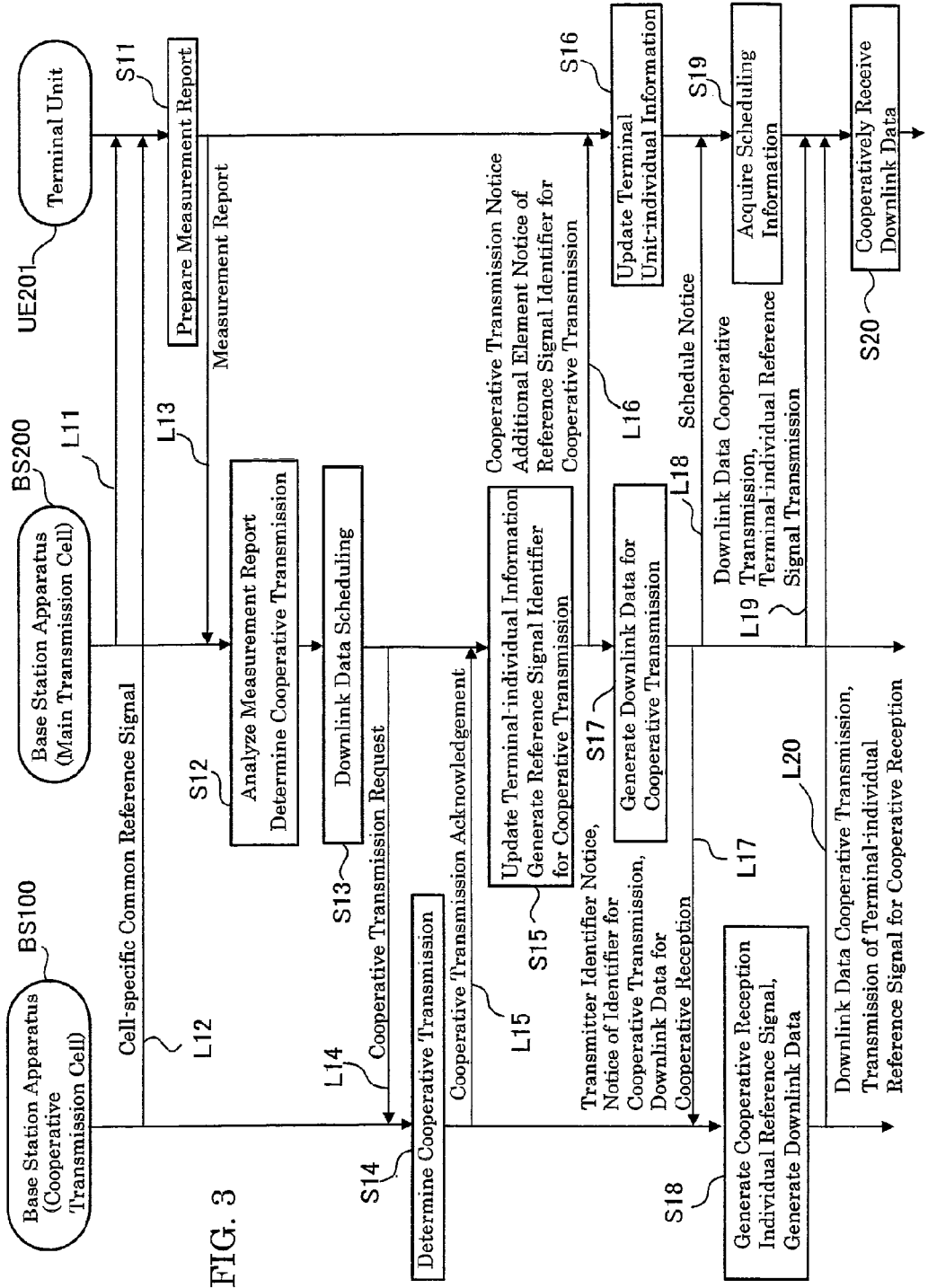

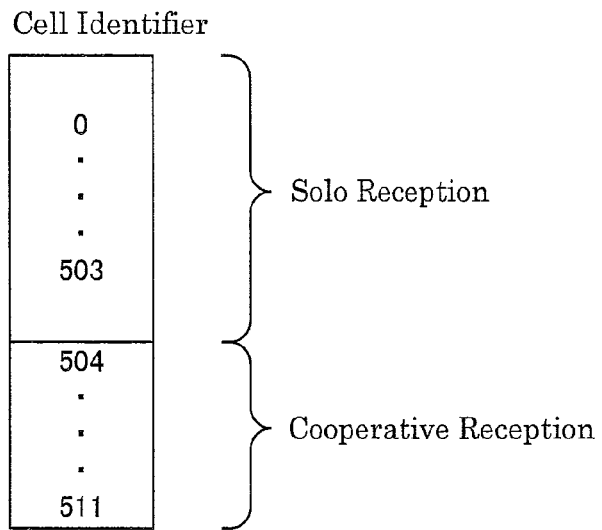

→ Downlink Data
◁--▷ Backhaul

BASE STATION APPARATUSES, TERMINAL UNIT, RADIO COMMUNICATION SYSTEM HAVING THOSE APPARATUSES, AND PROGRAM TO BE EXECUTED BY THE BASE STATIONS

TECHNICAL FIELD

The present invention relates to a communication technology using radio communication technologies, and in particular relates to base station apparatuses and a terminal unit that perform cooperative reception between a plurality of base stations and a terminal unit, a terminal unit, a radio communication system having those and a program to be executed by the base stations.

BACKGROUND ART

At present, evolved 3rd generation radio access (Evolved Universal Terrestrial Radio Access, which will be referred to hereinbelow as "SUTRA") and advanced 3rd generation radio access network (Evolved Universal Terrestrial Radio Access Network, which will be referred to hereinbelow as "EUTRAN") are under investigation. These specifications are called long-term evolution (Long Term Evolution, which will be referred to hereinbelow as "LTE"). As the downlink of EUTRA, OFDMA (Orthogonal Frequency Division Multiplexing Access) schemes have been proposed (Non-Patent Document 1).

Further, as the next-generation EUTRA and EUTRAN, advanced long-term evolution (LTE-Advanced) has been proposed (Non-Patent Document 2). Also, as one of technologies applied to this, inter-cell cooperative reception has been proposed (Non-Patent Documents 3 and 4).

The contents of the above technologies will be briefly described hereinbelow.

1) Explanation on the Downlink Radio Frame Structure in EUTRA

As to the allocation of downlink radio channels in an OFDMA scheme, methods of multiplexing in time and frequency using resources spreading along the frequency axis (sub-carriers) of OFDM signals and the time axis (OFDM symbols), by time division multiplexing TDM (Time Division Multiplexing), frequency division multiplexing (Frequency Division Multiplexing) or combination of TDM and FDM have been proposed.

Further, in the technical specification document prepared by the international conference of 3GPP EUTRA technical investigation, a downlink radio frame configuration and a radio channel mapping method have been proposed.

FIG. 17 shows a configurational example of a downlink radio frame in EUTRA proposed by 3GPP, and is a diagram showing an example of radio channel mapping. The downlink radio frame shown in FIG. 17 is a group of multiple sub-carriers on the frequency axis (vertical axis) and is comprised of symbols arranged across a frequency bandwidth Bch and along the time axis (horizontal axis). As illustrated, one slot consists of 7 symbols, and two slots form one sub-frame. A two-dimensional radio resource block is formed of 12 sub-carriers by 7 symbols. Two consecutive radio resource blocks on the time axis forms a resource block pair (RG pair), which is enclosed by the bold line in FIG. 17. A plurality of resource block pairs (RB pairs) of this kind form one radio frame. Here, the minimum unit, formed by one sub-carrier and one OFDM symbol, is called a resource element.

For example, as shown in FIG. 17, the whole spectrum of the downlink (the system frequency bandwidth Bch specific to the base station) is 20 MHz wide on the frequency axis, one radio frame has a size of 10 ms, one subframe SF has a size of 1 ms, and 12 sub-carriers and one subframe (1 ms) form a resource block pair (RB pair). When the sub-carrier frequency bandwidth Bsc is assumed to be 15 kHz, the frequency bandwidth Bch of the resource block is 180 kHz (15 kHz×12). In downlink, 1200 sub-carriers are included in the whole 20 MHz band. One radio frame includes 100 RBs.

In the case of four transmission antennas shown in FIG. 17, it is understood that the reference signals RS0 of the first antenna (the reference signal in the figure is denoted such that RS0, for example is abbreviated to R0 by omitting S from RS) and the reference signals RS1 of the second antenna are included at the first, fifth, eighth and twelfth OFDM symbols. Similarly, the reference signals RS2 of the third antenna and the reference signals RS3 of the fourth antenna are distributed at the second and ninth OFDM symbols (see Non-Patent Document 1 below).

2) Explanation on Beam-Forming

Use of an array antenna having a plurality of antennas arranged therein makes it possible to realize a technology called the beam-forming stated above, whereby the gains and directivities of the beam patterns of the transmission/reception antennas are varied (Non-Patent Document 4). Application of beam-forming can enlarge the communication coverage distance and reduce interference in communication by multiple apparatuses. In LTE, when beam-forming is applied to transmission to a terminal unit, transmission is performed from the sixth antenna so that a reference signal RS5 specific to the terminal is transmitted from the sixth antenna. FIG. 18 shows one example of allocation of RS5. The ID code of reference signal RS5 is generated by performing an operation using an intra-cell terminal identifier (Cell-specific-Radio Network Temporary Identifier, which will be referred to hereinbelow as C-RNTI) that is allotted to every terminal and a cell identifier as variables, and is allocated upon communication with the terminal. The positions of allocation are shifted in the frequency direction, depending on the cell identifier.

3) Multi-User Multiple Input Multiple Output Scheme (MU-MIMO)

There has been a proposal of multiple input multiple output (Multi-Input Multi-Output, which will be referred to hereinbelow as MIMO) in which transmission and reception are carried out at the same frequency using a plurality of transmitting antennas and a plurality of receiving antennas so as to perform channel multiplexing by generating multiple channels between the transmitting and receiving antennas (see Non-Patent Document 5). MU-MIMO (multiple user MIMO) is a scheme in which MIMO is implemented using a plurality of terminals, and enables a plurality of terminals to perform communications simultaneously using the same frequency.

4) Explanation on Beam-Forming Using Direction of Arrival Estimation (Direction of Arrival, which Will be Referred to Hereinbelow as DOA)

To perform beam forming, there are two schemes: a closed-loop weight coefficient feedback scheme in which the terminal unit selects the weight coefficients for the individual transmitting antennas to be used to realize the directivity when the base station performs transmission to the terminal unit, so as to realize the optimal directivity, and transmits the weight coefficients to be used to the base station apparatus, then base station apparatus weights the transmitting antennas with the transmitted weight coefficients, to thereby realize the optimal directivity; and an open-loop weight coefficient scheme in which instead of transmission of weighting coefficients from the terminal unit, the base station selects weighting coefficients on its own right to perform weighting. As the open-loop weighting scheme, there is a proposal of a direction-of-arrival estimation (DOA) technique in which the base station apparatus estimates the direction of arrival from the uplink signal of the terminal unit and selects the weighing coefficients that realizes the directivity toward that direction to thereby perform transmission (Non-Patent Document 6).

5) Multiple Base Station Signal Cooperative Reception Scheme

In order to improve the reception characteristics of terminal units at the edge of cell, there are proposals of multiple base station signal cooperative reception schemes in which simultaneous transmissions are performed by a plurality of base stations so that the terminal unit can receive the signal from the multiple base stations (Non-Patent Documents 2 and 3). In these schemes, the signal from each of the multiple base station apparatuses are regarded as a transmission signal from one antenna so as to implement MIMO to obtain improvement of the reception quality thanks to transmission diversity effect or to thereby double the transmission capacity by virtue of spatial multiplexing effect. FIG. 19 shows the outline of a multiple base station signal cooperative reception scheme. Terminal unit UE100 not only receives a signal from base station apparatus 100, which is the main one, but also receives signals from surrounding base station apparatuses BS200, BS500, BS600 and BS700 at the same time. When there is a large distance between terminal unit UE100 and base station apparatus BS100, generally the reception characteristics lower. This degradation of the characteristics is suppressed by simultaneous reception of the signals from other base stations. Also, terminal unit UE101 also performs communication mainly with base station apparatus BS100. However, since the distance is short, a single base station BS300 is good enough as the extra base stations for implementation of cooperative reception. In this way, the positions and number of base stations to be used for cooperative reception are adaptively varied depending on the position of the terminal unit. The base stations are connected communication lines called back haul. For example, data to be transmitted to terminal unit UE101 is composed of data transmitted from base station apparatus BS100 and data transmitted from BS300 via the backhaul

PRIOR ART DOCUMENTS

Non-Patent Documents

Non-Patent Document 1: 3GPP TS 36.211, V8. 3.0 (2008-05), Technical Specification Group Radio Access Network; Evolved Universal Terrestrial Radio Access (E-UTRA); Physical Channels and Modulation (Release 8). Internet <URL:http://www.3gpp.org/ftp/Specs/html-info/36211.htm>

Non-Patent Document 2: "Proposals for LTE-Advanced Technologies", 3GPP TSG RAN WG1 Meeting #53bis, NTT DoCoMo, Inc., Warsaw, Poland, Jun. 30-Jul. 4, 2008, R1-082575

Non-Patent Document 3: "A discussion on some technology components for LTE-Advanced", 3GPP TSG RAN WG1 #53, Kansas City, USA, May 5-9, 2008, R1-082024

Non-Patent Document 4: "Adaptive Antenna Technology" written by Nobuyoshi Kikuma, published by Ohmsha, Oct. 10, 2003, pp. 11-15

Non-Patent Document 5: Yoshio Karasawa "MIMO fushigi tanken (MIMO mysterious exploration)", Denko Technical Paper, 2006, No. 40, pp. ii-ix Non-Patent Document 6: Yongming LIANG et. al "DOA Based Open-Loop Scheme for Precoding MIMO Systems" The Institute of Electronics, Information and Communication Engineers, Commutation Thesis Collection 1 of 2008 IEICE Society Conference, BS-4-12, pp. S53-S54

SUMMARY OF THE INVENTION

Problems to be Solved by the Invention

When beam-forming and MIMO are implemented, it is necessary for the terminal unit to receive a reference signal to be the standard signal. Similarly, it is also necessary to have a reference signal when cooperative reception is implemented using a plurality of base stations. However, there is no disclosure of a specific technique in Non-Patent Document 3. Considered as a simple technique is a method of using the reference signal specific to the terminal that is used when the base station implements beam-forming toward the terminal unit. In this method, each base station apparatus is regarded as a single antenna, and the reference signals RS5 specific to the terminal, of different base stations are regarded as reference signals RS0 to RS3 if, for example, four base stations are used when cooperative reception is performed, so as to implement cooperative reception in the same scheme as that of usual MIMO.

In this case, the terminal-specific reference signal RS5 from each base station apparatus is generated by performing an operation using C-RNTI and the cell identifier of each base station apparatus as variables. However, since the terminal unit exchanges information with only the main transmitting apparatus, the terminal does not have any information on cell identifiers of the other base station apparatuses that perform cooperative transmission. Accordingly, there is the problem that all of the ID codes of the reference signals cannot be known.

Further, since C-RNTIs are assigned by each base station apparatus to the terminal units in the closed status inside the base station apparatus, there is a possibility that the same C-RNTI has been used in different base stations that perform cooperative transmission. Even in this case, since the cell identifiers are different, the identifier code of the terminal-specific reference signal allocated by each base station is generated by the operation using a variable different from one base station to another. But still, the operation results present reduced randomness compared to the case where different C-RNTIs are used. This brings about deterioration of mutual correlation characteristics between the codes of individual signals RS5, and causes erroneous determination and leads performance deterioration.

Further, as for the allocation of terminal-specific reference signals RS5, the positions of allocation are shifted in the frequency direction, depending on the cell identifier as stated above. In the example shown in FIG. 18, the reference signals are laid out every four sub-carriers. This means that only up to four terminal-specific reference signals RS5 from different base stations that perform cooperative transmission can be deployed, or that it is impossible to perform cooperative transmission using five or more base stations. Alternatively, there is another scheme for cooperative reception, which instead of using terminal-specific reference signals RS5, common reference signals RS0 to RS3 that are common to the base station apparatuses that perform cooperative transmission are used. Also in this case, RS0 to RS3 are laid out every three sub-carriers. The positions of allocation in the frequency direction in accordance with the cell identifiers are shifted every three sub-carriers, so that there are only three kinds of allocation patterns in conformity with that. This also means that it is impossible to perform cooperative transmission using four or more base stations.

In view of the above circumstances, the present invention is to provide base station apparatuses, a terminal unit and a radio communication system having those and a program to be executed by the base station, which can alleviate constraint brought by generation of ID codes of reference signals to be used for cooperative reception and the allocation of the reference signals when radio communication is carried out between a plurality of base station apparatuses and a terminal unit.

Means for Solving the Problems

In order to solve the above problem, the present invention resides in a base station apparatus that performs main normal transmission if a communication-target terminal unit exists in the cell thereof and that can perform cooperative transmission when the communication-target terminal unit exists in another cell, comprising:
a reference signal ID code determining means that determines the ID code of a reference signal specific to the terminal unit; a reference signal generating means that generates the reference signal based on the determined ID code; and, a transmitting means that transmits a signal including the reference signal,
characterized in that the reference signal generating means generates a reference signal for cooperative transmission to be used when the communication-target terminal unit exists in a cooperative transmission cell such as to be different from the reference signal for main transmission that is used by the base station apparatus for performing main transmission, and the transmitting means transmits the generated reference signal for cooperative transmission to the terminal.

It is characterized in that herein that the reference signal ID code determining means generates an ID code of a reference signal for cooperative transmission by using a variable that is different from the ID code of the reference signal for main transmission of the base station apparatus that performs main transmission to the communication-target terminal unit.

It is also characterized in that the reference signal ID code determining means generates an ID code of a reference signal for cooperative transmission by performing an operation using the cell ID code used by the base station apparatus of the main transmission cell and the value that is obtained by operating the intra-cell terminal identifier assigned to the terminal unit by the base station apparatus of the main transmission cell, as variables.

It is also characterized in that the reference signal ID code determining means generates an ID code of a reference signal for cooperative transmission by performing an operation using the cell ID code used by the base station apparatus of the main transmission cell and the value that is obtained by operating the intra-cell terminal identifier assigned to the terminal unit by the base station apparatus of the main transmission cell, as variables.

It is also characterized in that the reference signal ID code determining means uses a cell identifier of a cooperative transmission cell as the variable for generating the ID code of a reference signal for cooperative transmission.

It is also characterized in that the reference signal ID code determining means uses a cell identifier that is different from the cell identifier of the main transmission cell for the communication-target terminal unit and an intra-cell terminal identifier assigned to the terminal unit by the base station apparatus of the main transmission cell, as the variables for generating an ID code of a reference signal for cooperative transmission It is also characterized in that the reference signal ID code determining means uses a cell identifier of a connected terminal limiting cell for the communication-target terminal unit and part of intra-cell terminal identifier among intra-cell identifiers assigned to the terminal unit by the base station apparatus of the main transmission cell, as the variables for generating an ID code of a reference signal for cooperative transmission.

The base station apparatus further includes a weighting means that determines weighting coefficients for forming a beam directed toward the location of the base station apparatus of the main transmission cell, and characterized in that a beam-forming scheme in which the weighting coefficients are transmitted by the transmitting means is used.

The base station apparatus further includes a weighting means that determines weighting coefficients for a signal from a base station apparatus, based on the cell-specific common reference signal transmitted from each base station apparatus, and characterized in that a multi-terminal multiple input multiple output scheme in which the base station apparatus of the main transmission cell transmits the weighting coefficients determined by the weighting means to the terminal unit the transmitting means, is used.

Herein, it is characterized in that a means for estimating the direction of arrival of a signal from the terminal unit is further provided and the weighting means determines weighting coefficients.

It is also characterized in that the reference signal generating means makes the allocation of reference signals for cooperative transmission in the resource block different from the allocation of the reference signals for main transmission.

It is also characterized in that the reference signal generating means carries out allocation of reference signals for cooperative transmission in the resource block by time-dividing the reference signal of the main transmission cell and the reference signal of the cooperative transmission cell.

The base station apparatus using a multi-terminal multiple input multiple output scheme is characterized in that the reference signal generating means makes the allocation of reference signals for cooperative transmission in the resource block different from the allocation of the reference signals for main transmission, and when the positions of allocation of the common reference signals overlap, the position of the overlapping reference signal of cooperative transmission cell is assigned to another transmission symbol and reference signals at part of transmission symbols will not be transmitted.

It is also characterized in that the transmitting means performs cooperative transmission using specific frequency bands only.

It is also characterized in that the transmitting means performs cooperative transmission using specific time zones only.

The present invention resides in a terminal unit that can receive signals from a plurality of base station apparatuses simultaneously and perform cooperative reception, comprising: a means that simultaneously receives signals from base station apparatuses; a channel estimating means that estimates channel variations based on the received reference signals to determine channel variation compensation values; and a channel compensating means that compensates the channel variation of the signal from each base station apparatus, based on the channel variation compensation value.

The present invention resides in a radio communication system configured of the base station apparatuses and the terminal unit and is characterized in that the terminal unit cooperatively receives signals from a plurality of the base station apparatuses simultaneously.

The present invention resides in a program that can be loaded into, and executed by, a base station apparatus that performs main normal transmission if a communication-target terminal unit exists in the cell thereof and that can perform cooperative transmission when the communication-target terminal unit exists in another cell, causing the base station apparatus to function as a reference signal ID code determining means that determines the ID code of a reference signal specific to the terminal unit; a reference signal generating means that generates the reference signal based on the determined ID code, and, is characterized in that the reference signal generating means generates a reference signal for cooperative transmission to be used when the communication-target terminal unit exists in a cooperative transmission cell such as to be different from the reference signal for main transmission that is used by the base station apparatus for performing main transmission, and a transmitting means is caused to transmit the reference signal to the terminal unit.

Effect of the Invention

According to the present invention, in a radio communication system including a plurality of base station apparatuses and a terminal unit and in which the terminal unit simultaneously performs cooperative reception of signals from a plurality of base stations, it is possible to alleviate constraint brought by generation of ID codes of reference signals to be used for cooperative reception and the allocation of the reference signals.

BRIEF DESCRIPTION OF THE DRAWINGS

[FIG. 2] is a diagram chart showing one example of the procedures from connection establishment between a base station apparatus and a terminal unit in LTE until data communication is started.

[FIG. 3] is a diagram chart for the first embodiment of the present invention, showing one example of the procedures of a terminal unit and base station apparatuses when the terminal unit implements cooperative reception in a communication system performing cooperative reception.

[FIG. 4] is a diagram for the first embodiment of the present invention, showing allocation of cell identifiers as a variable to be used for generating an identifier of a terminal-specific reference signal used in a communication system performing cooperative reception.

[FIG. 5] is a diagram for the first embodiment of the present invention, showing allocation of cell identifiers as a variable to be used for generating an identifier of a terminal-specific reference signal used in a communication system performing cooperative reception.

MODE FOR CARRYING OUT THE INVENTION

Now, explanation of radio communication system of an embodiment of the present invention will be made with reference to the drawings.

<The First Embodiment>

Figure 1:
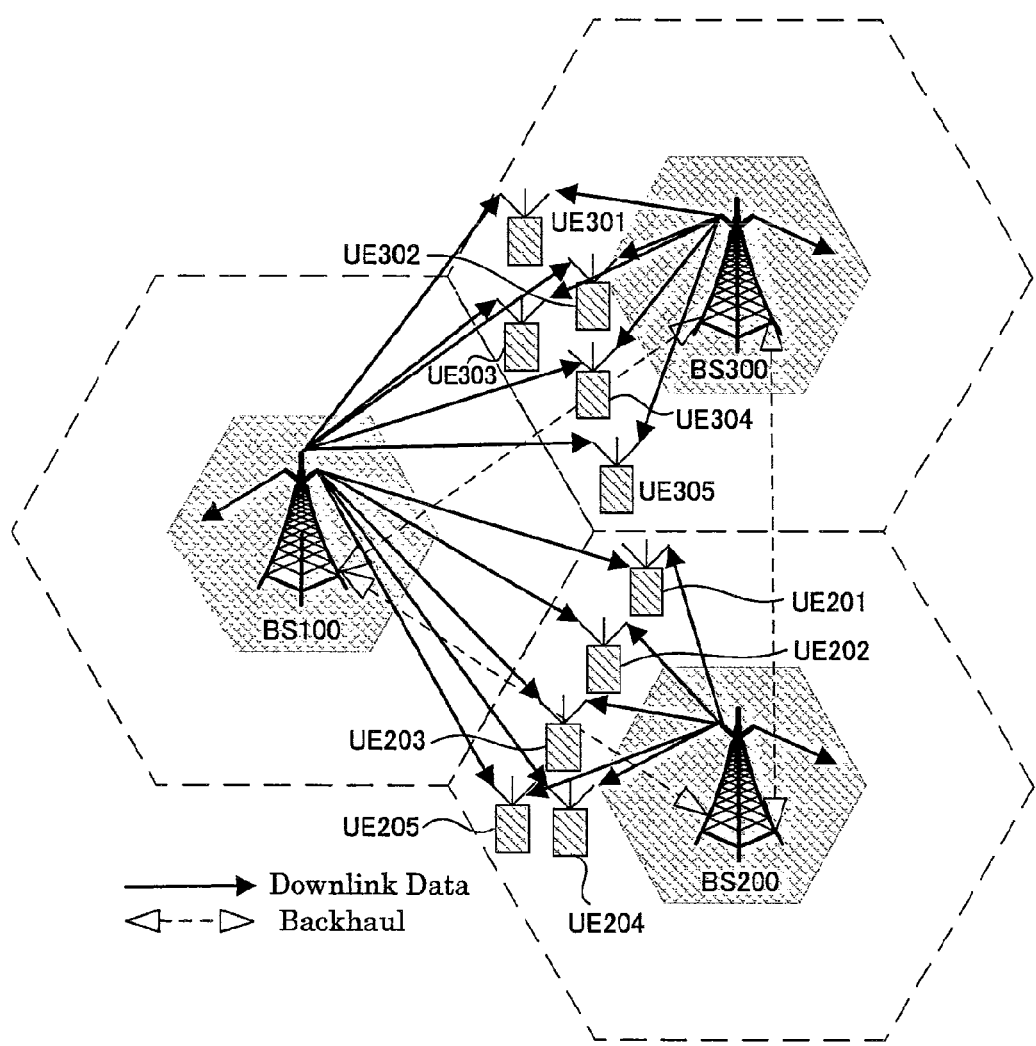
[FIG. 1] is a conceptual diagram for the first embodiment of the present invention, showing a case where a terminal unit uses a reference signal different from the reference signal which the terminal unit uses in demodulating the signal from a single base station.
Figure 19:
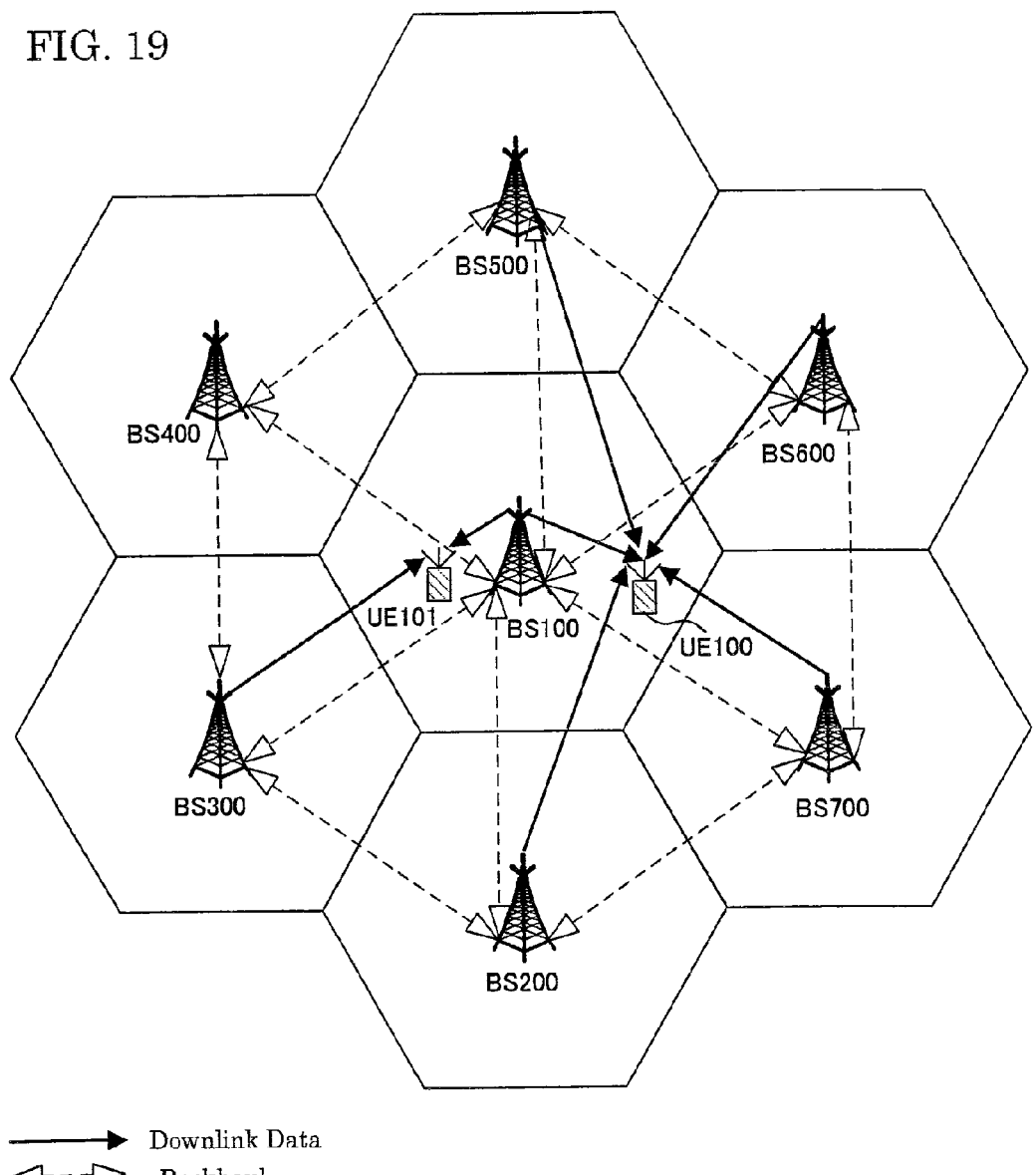
[FIG. 19] is a diagram showing the outline of a multiple base station signal cooperative reception scheme.

FIG. 1 is a diagram showing a radio communication system that performs cooperative reception using a plurality of base stations according to the first embodiment of the present invention, and is a conceptual diagram showing a case where a terminal unit uses a reference signal that is different from the reference signal the terminal unit uses when the signal from a single base station is demodulated. For simplicity, description will be given by taking an example of three cells of three base station apparatuses BS100, BS200 and BS300, but the number of actual base stations may be a different number as shown in FIG. 19.

Terminal units UE201 to UE205 are terminal units existing in the cellular zone of a base station apparatus BS200 and are performing communication with base station apparatus BS200. Terminal units UE301 to UE305 are terminal units existing in the cellular zone of a base station apparatus BS300 and are performing communication with base station apparatus BS300. It is assumed that for demodulation of the signals from each base station apparatus, the reference signal specific to each terminal unit from the associated base station is used.

Here, the cell of a base station apparatus in which the terminal unit to be communicated exists is called the main transmission cell, whereas the cell of a base station apparatus in which the terminal unit to be communicated does not exist, the base station apparatus performing cooperative transmission to the terminal unit, is called a cooperative transmission cell.

Now, when terminal unit UE201 is located at the edge of cell and the reception characteristic degrades, another base station apparatus, specifically, base station apparatus BS100 also performs cooperative transmission while terminal unit UE201 performs cooperative reception. In this case, in order to demodulate the signal from base station apparatus BS100 of the cooperative transmission cell, an ID code of a reference signal that is different from the reference signal terminal unit UE201 uses to demodulate the signal from base station apparatus BS200 (the base station apparatus of the main transmission cell) alone is used as the ID code of the reference signal that is transmitted from base station apparatus BS100 and specific to the terminal unit. The ID code of this reference signal is generated using a variable that is different from the variable base station apparatus BS100 uses to generate the ID code of the reference signal when performing communication with base station apparatus BS200 alone. This code uses a code that is higher in randomness with the code of the aforementioned reference signal. With this, it is possible to secure randomness between the ID codes of the reference signals used at base station apparatuses BS100 and BS200.

As one example of generating the ID code of the reference signal of this cooperative transmission cell, there is a generating method by performing an operation using the cell identifier of the cooperative transmission cell and a value that is obtained by operating the intra-cell terminal identifier (C-RNTI) assigned to the terminal by the main transmission cell, as variables.

In LTE, the ID code of the reference signal in the case of performing communication with a single base station is generated by performing an operation using the cell identifier and a value that is obtained by operating the intra-cell terminal identifier (C-RNTI) assigned to the terminal by the transmission cell, as variables. Detailedly, the initial value of the ID code of the reference signal is given as follows:

The initial value of the ID code $$=f(\text{Cell } ID, C\text{-}RNTI, \text{Slot\#}) \quad (1).$$

Here, Cell ID denotes the cell identifier, Slot# the slot number in which the reference signal is included.

FIG. 2 shows the procedures from establishment of connection between the base station apparatus of the main transmission cell and a terminal unit up to the start of data communication in LTE. Base station apparatus BS200 transmits a synchronization signal (L1). The synchronization signal includes information on the cell identifier of base station apparatus BS200. Terminal unit UE201 receives this synchronization signal to recognize the cell identifier of base station apparatus BS200, whereby it is possible to determine base station apparatus BS200 in time with establishment of synchronization (S1). Base station apparatus BS200 also transmits a common reference signal in the cell (L2). Further, the base station apparatus transmits information depending on this base station apparatus BS200 as an indication signal (L3). Receiving this indication signal, terminal unit UE201 acquires information depending on this base station apparatus BS200 (S2). It should be noted that the synchronization signal, common reference signal and indication signal are continually transmitted at regular intervals without regard to the following steps.

Terminal unit UE201 transmits a random access request to base station apparatus BS200 in order to establish connection with base station apparatus BS200 (L4). Base station apparatus BS200 recognizes terminal unit UE201 from the random access request from terminal unit UE201. If permitting establishment of connection, the base station apparatus issues an intra-cell terminal identifier (C-RNTI) and assigns the identifier to terminal unit UE201 to thereby set up terminal unit-individual information (S3) and transmits the information to terminal unit UE201 as a replay to the random access request (L5). When receiving this, terminal unit UE201 acquires the terminal unit-individual information including intra-cell terminal identifier(C-RNTI) (S4).

Next, when there exists data to be transmitted from base station apparatus BS200 to terminal unit UE201, base station apparatus BS200 makes out a schedule for transmission of the data on the downlink (S5) and transmits the scheduling information (L6). Terminal unit UE201 receiving the transmission, acquires the scheduling information (S7). Base station apparatus BS200 generates downlink data (S6) and transmits this (L7). Terminal unit UE201 receives the transmitted downlink data signal (S8). Here, base station apparatus BS200 may generate and transmit the reference signal specific to the terminal at the same time with transmission of the downlink data signal.

Thereafter, when the reception status has changed by movement of terminal unit UE201 or for other reasons, base station apparatus BS200 updates the individual information on terminal unit UE201 (S9) and transmits the update to the terminal unit (L8). Terminal unit UE201 receives this and updates the information (S10).

In contrast to this, in the present embodiment, the ID code of the reference signal transmitted by main transmission cell BS200 is generated in the same method as the formula (1), whereas the ID code of the reference signal transmitted by cooperative transmission cell BS100 is generated by the flowing formula.

The initial value of the ID code $$=f(\text{Cell } ID, g(C\text{-}RNTI), \text{Slot\#}) \quad (2).$$

Here, the Cell ID is not the cell identifier of cooperative transmission cell BS100 but is the cell identifier of main transmission cell BS200. The g(C-RNTI) is the result that is obtained by performing an operation g on the C-RNTI assigned to terminal unit UE201 by main transmission cell BS200. The operation g may be simple addition of a certain constant or may be given as another function.

When this operation has been defined beforehand in the system and shared by the base stations and terminal units, this brings the advantage that the base station apparatus of a cooperative transmission cell does not need to transmit information for the ID code of the terminal-specific reference signal of the cooperative transmission cell to the terminal unit. Alternatively, there is also such a method that no specific operational content of this operation g is defined. In this case, it is necessary to transmit information for the ID code of a terminal-specific reference signal of the cooperative transmission cell from the base station apparatus of the cooperative transmission cell to the terminal unit, but it is satisfactory that the difference between the C-RNTI assigned to the terminal unit by the main transmission cell and the g(C-RNTI) used for generation of the ID code of the reference signal of the cooperative transmission cell is sent to the terminal unit.

Since this difference is of a lower number of bits than that of bits for representing the whole ID code of the reference signal, this also has the advantage that the transmission volume at transmission can be cut down.

The procedures of cooperative reception implemented between terminal unit UE201, transmitter (main transmitter) BS200 of the base station apparatus of the main transmission cell and the transmitter (cooperative transmitter) BS100 of the base station apparatus of the cooperative transmission cell in the present embodiment will be explained focusing on the generation and notification of the ID codes of reference signals with FIG. 3. It is assumed herein that terminal unit UE201 has been already connected with transmitter (main transmitter) BS200 of the main base station and that cooperative transmitter BS100 is going to start cooperative transmission. The steps theretofore are the same as the steps of the conventional LTE so that the description is omitted.

Main transmitter BS200 and cooperative transmitter BS100 are both transmitting common reference signals (L11, L12). Terminal unit UE201 is continuously checking the status of reference signals, creates a measurement report (S11) if the reception status varies, and transmits the measurement report to base station apparatus BS200 that is being connected (L13). Now, it is assumed that the reception status on BS200 having been connected deteriorates at terminal unit UE201 while the reception status on the other transmitter BS100 is fair to a certain degree. If base station apparatus (main transmitter) BS200 being currently connected, determines the need for cooperative reception (S12), the base station apparatus performs scheduling for cooperative reception (S13) and requests base station BS100 to perform cooperative reception (L14). If base station BS100 to perform cooperative reception determines that it is possible to do (S14), the base station transmits an acknowledgement (L15). Then, main transmitter BS200 updates the individual information on terminal unit UE201 in order to perform cooperative transmission and generates the ID code of the individual reference signal to be used by cooperative transmitter BS100 in the aforementioned method (S15). The individual information is transmitted to terminal unit UE201. At this point, if the system is such that the operation used to generate the ID code of the reference signal is not shared between the terminal unit UE201 and base station apparatuses, the information on the difference between the aforementioned C-RNTI and g(C-RNTI), for example, is also transmitted at this stage (L16). Terminal unit UE201 updates the individual information and also checks the ID code of the terminal-individual reference signal to be used by cooperative transmitter BS100 (S16).

Next, main transmitter BS200 generates downlink data for cooperative transmission (S17) and transmits the data together with the ID code of the individual reference signal, generated above, to cooperative transmitter BS100 (L17). Cooperative transmitter BS100 receives the downlink data and the ID code of the individual reference signal from main transmitter BS200 and generates a cooperative reception individual reference signal and downlink data (S18). Base station apparatus BS200 transmits scheduling information to terminal unit UE201 (L18). Terminal unit UE201 acquires and checks the schedule information (S19). Main transmitter BS200 transmits downlink data and the reference signal to terminal unit UE201 (L19). Cooperative transmitter BS100 transmits the generated cooperative reception individual reference signal and downlink data to terminal unit UE201 (L20). Terminal unit UE201 receives these signals to perform cooperative reception (S20).

In the above example, as the variables used to generate the ID code of the terminal-individual reference signal, the cell identifier as the variable used for generation of the ID code of the terminal-individual reference signal of the main transmission cell has been used for both the main transmission cell and the cooperative transmission cell. However, there is another method in which the cell identifier of the cooperative transmission cell is used as the variable to be used for generation of the ID code of the terminal-individual reference signal transmitted from the cooperative transmission cell. In this case, the ID code of the reference signal transmitted by cooperative transmission cell BS100 is generated by the following formula.

The initial value of the ID code $$=f(\text{Cell } ID\text{-}Corp, C\text{-}RNTI, \text{Slot\#}) \qquad (3).$$

Here, Cell ID-Corp is the cell identifier of cooperative transmission cell BS100.

In this case, in order for terminal unit UE201 to obtain the ID code of the terminal-individual reference signal transmitted from cooperative transmission cell BS100, it is necessary to know Cell ID-Corp, the cell identifier of cooperative transmission cell BS100. However, since terminal unit UE201 exchanges information with main transmitter BS200 only, it is necessary to perform a separate transmission. This is done by L16, the aforementioned transmission from main transmitter BS200 to terminal unit UE201. Usually, the bit information of a cell identifier is smaller than the number of bits required for C-RNTI or the ID code of a reference signal, hence this case also has the advantage that the volume of information to be transmitted becomes lower.

As another method of generating an ID code of the terminal-individual reference signal, there is a method in which a special cell identifier is used as the variable to be used for generation of the ID code of the terminal-individual reference signal. In LTE, as a cell identifier to be used for solo reception, the values 0 to 503 are assigned, which can be represented by 9 bits. However, 504 to 511 are not used despite the fact that these can also be represented by 9 bits. FIG. 4 shows this concept. In the embodiment, as the variable used for generation of the ID code of the terminal-individual reference signal in cooperative reception, these identifiers being unused are utilized.

Specifically, generation is performed by the following formula.

The initial value of the ID code $$=f(\text{Cell } ID\text{-}Ext, C\text{-}RNTI, \text{Slot\#}) \qquad (4).$$

Here, Cell ID-Ext is a cell identifier that is not used in the current LTE.

With this, it is possible to generate an ID code that is definitely different from the existing ID codes of the terminal-individual reference signals at the time of cooperative reception.

Further, as another embodiment, there is also a method in which a cell identifier of a connected terminal limiting cell and an intra-cell terminal identifier (C-RNTI) that is partly reserved for cooperative reception are used as the variables for generation of an ID code of a terminal-individual reference signal. In LTE, it has been proposed that a connected terminal limiting cell that limits connectable terminals is defined and the cell identifiers for this cell are assigned with part of cell identifiers, among cell identifiers, which are defined to be exclusively used for this cell.

FIG. 5 shows this concept. It is assumed herein that cell identifiers 0 to 383 are used for solo reception, and 384 to 503 are used for connected terminal limiting cells. In the present embodiment, as the variable used for generation of ID codes of terminal-individual reference signals to be used for cooperative reception, the cell identifiers of connected terminal limiting cells, and C-RNTI uses C-RNTIs that are partly reserved for cooperative reception. Accordingly, in FIG. 5, C-RNTIs 0 to 32767 are used for connected terminal limiting cells, 32768 to 65535 are used for cooperative reception. A connected terminal limiting cell is usually small and accommodates few terminal units. Therefore, there occurs no problem in a connected terminal limiting cell if part of C-RNTIs is reserved for cooperative reception. As a result, it is possible to positively generate an ID code that is different from the ID codes of existing terminal-individual reference signals, at the time of cooperative reception.

<The Second Embodiment>

Figure 6:
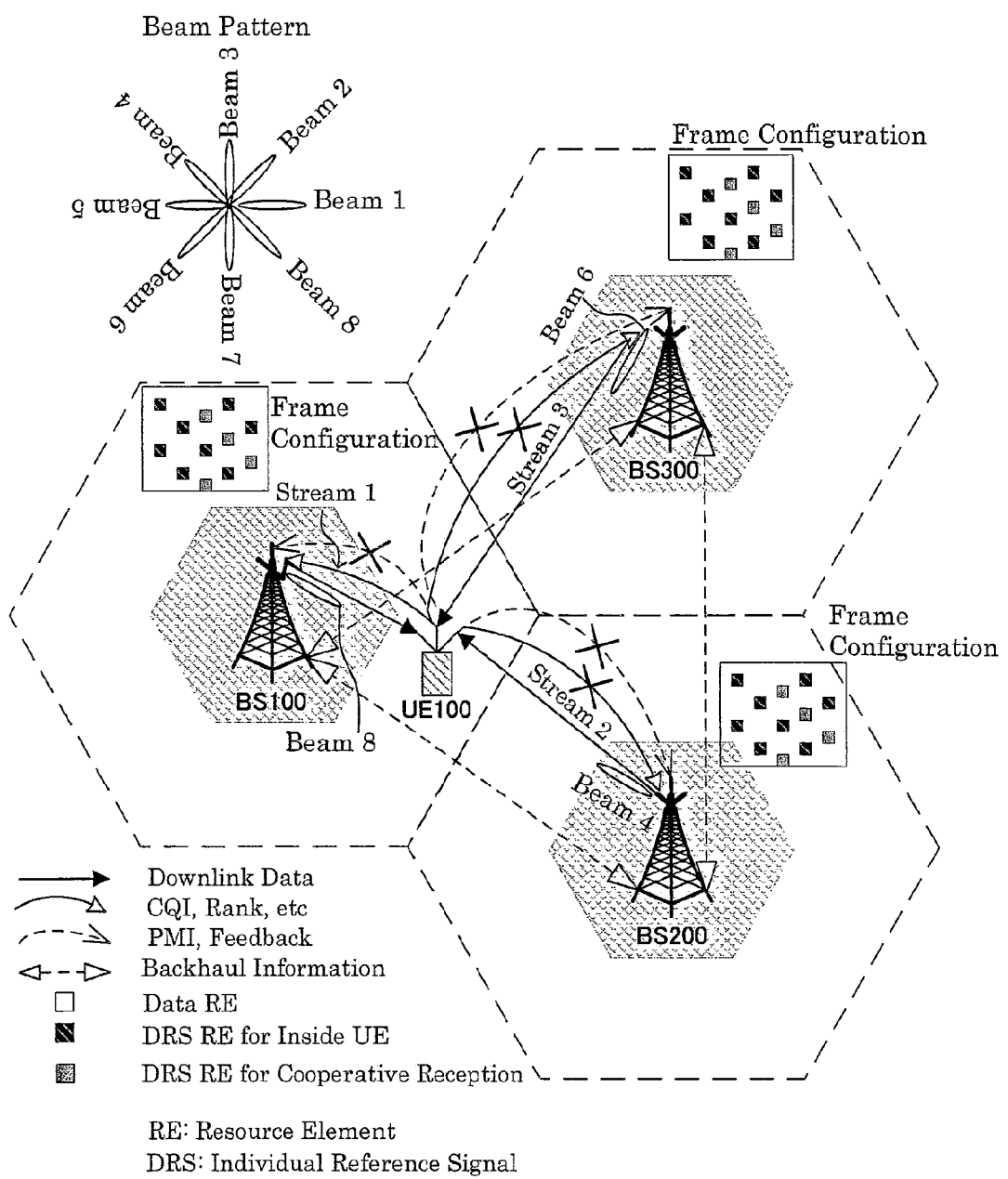
[FIG. 6] is a diagram for the second embodiment of the present invention, showing one example where an adaptive beam-forming scheme is used for transmissions from base stations.

FIG. 6 shows a radio communication system that performs cooperative reception using a plurality of base stations according to the second embodiment of the present invention, giving one example where an adaptive beam-forming scheme is used for transmissions from the base stations.

Terminal unit UE100 is performing communication with base station apparatus BS100 as the main transmission cell, but also receives signals from base station apparatuses BS200 and BS300 at the same time to perform cooperative reception when the terminal is located at the edge of cell. Each of the base stations arbitrarily determines which beam pattern should be formed, or which weight coefficients should be used for weighting when receiving signals from base station apparatuses BS200 and BS300. Since base station apparatuses BS200 and BS300 that perform cooperative transmission have been given a previous notice, through backhaul, of the base station apparatus that is designated as the main cell by the terminal to which cooperative transmission should be performed, the base station apparatuses for cooperative transmission may form respective beam patterns by selecting weighting coefficients such that the beam patterns are directed toward the base station apparatus of the main transmission cell.

For example, in FIG. 6, base station apparatus BS200 selects weight coefficients to form beam 4 whose the beam pattern is directed toward base station apparatus BS100. Base station apparatus BS300 selects weight coefficients to form beam 6 whose the beam pattern is directed toward base station apparatus BS100. In this way, when the adaptive beam-forming scheme is applied to transmission from base stations, there is the advantage that the method of selecting beam patterns in base station apparatuses BS100, BS200 and BS300 can be simplified. Further, this scheme has the advantage that terminal unit UE100 does not need to exchange information necessary for checking weighting coefficients with each of base station apparatuses BS100, BS200 and BS300, leading to saving of radio resources. Each of base station apparatuses BS100, BS200 and BS300 performs transmission by weighting the downlink data signal and the terminal-specific reference signal with the selected weight coefficients. The ID code of the terminal-specific reference signal is generated by the method described above.

Figure 7:
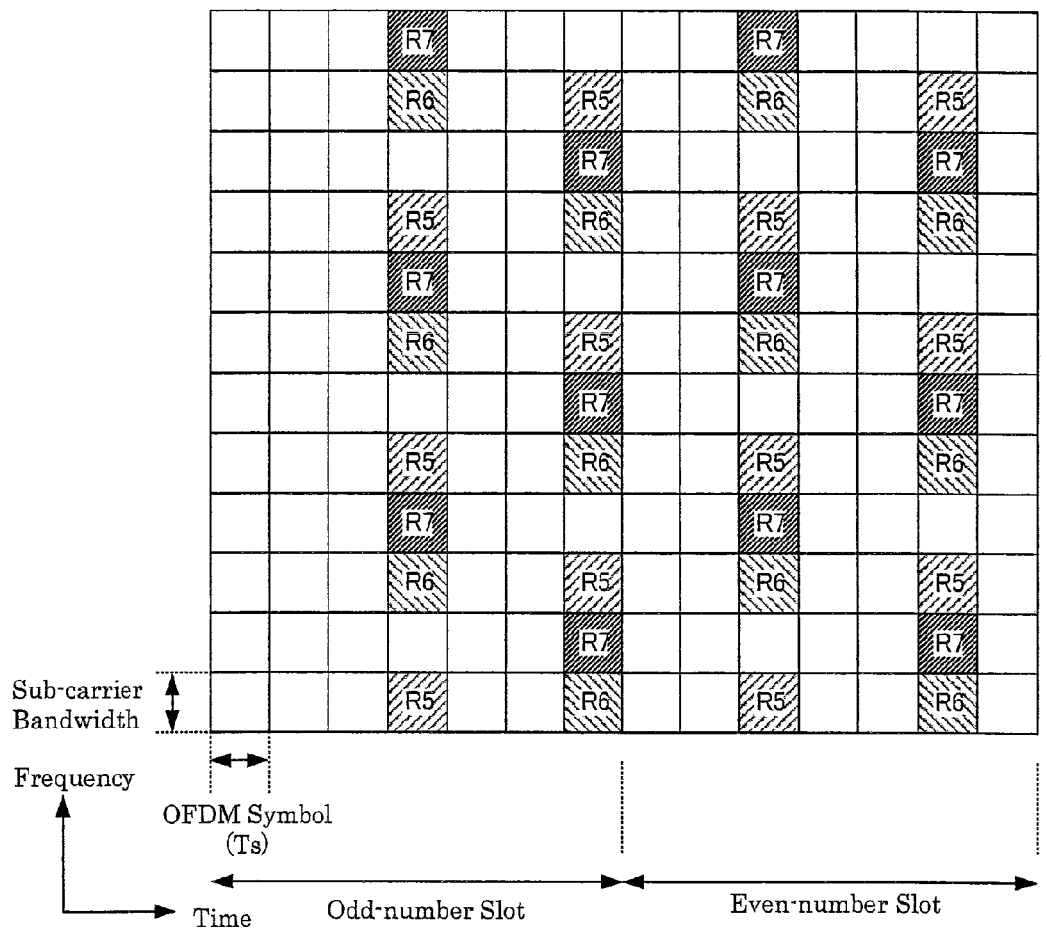
[FIG. 7] is a diagram for the second embodiment of the present invention, showing one example of positions of allocation of terminal-specific reference signals in a resource block when cooperative reception is performed.

FIG. 7 shows one example of allocation of terminal-specific reference signals in a resource block when cooperative reception is performed using a plurality of base station apparatuses BS200 and BS300 as the cooperative transmission cells. Here, R6 denotes the terminal-specific reference signal to be transmitted from base station apparatus BS200 and used for cooperative reception, and R7 denotes the terminal-specific reference signal to be transmitted from base station apparatus BS300 and used for cooperative reception. In LTE, allocation of terminal-specific reference signals in the resource block is made such that their positions of allocation are shifted in the frequency direction by a unique amount of shift in accordance with the cell identifier. However, since there are quite a few combinations of the cells that perform cooperative transmission, the amount of shift in accordance with the cell identifier of each cell will not necessarily be guaranteed to be different from the others. In the present embodiment, allocation of terminal-specific reference signals from cooperative transmission cells is determined regardless of the values of the cell identifiers of the cells that engage cooperative transmission.

As a specific example, when the main transmission cell requests another base station apparatus for cooperative transmission, the amount of shift is also given notice of so that the positions of allocation will not overlap. For example, if the amount of shift of main transmission cell BS100 is 0, BS100 notifies BS200 that the amount of shift is 2 regardless of the value of shift that is calculated based on the cell identifier of BS200 when the terminal unit receives the signal from BS200 alone. Similarly, the BS100 notifies BS300 that the amount of shift is 3 regardless of whatever the cell identifier of BS300 is.

In this way, when cooperative reception is performed, allocation of reference signals different from that of the terminal-specific apparatus to be used when no cooperative reception is carried out is made. This makes it possible to distribute the reference signals without causing the positions of allocation to overlap, regardless of the cell identifiers of the base stations that participate in cooperative reception. This allocation of positions of cooperative cells is sent to terminal unit 100 from main transmission cell BS100 as part of the terminal unit-individual information so that terminal unit UE100 can be aware of the positions of allocation.

<The Third Embodiment>

Figure 8:
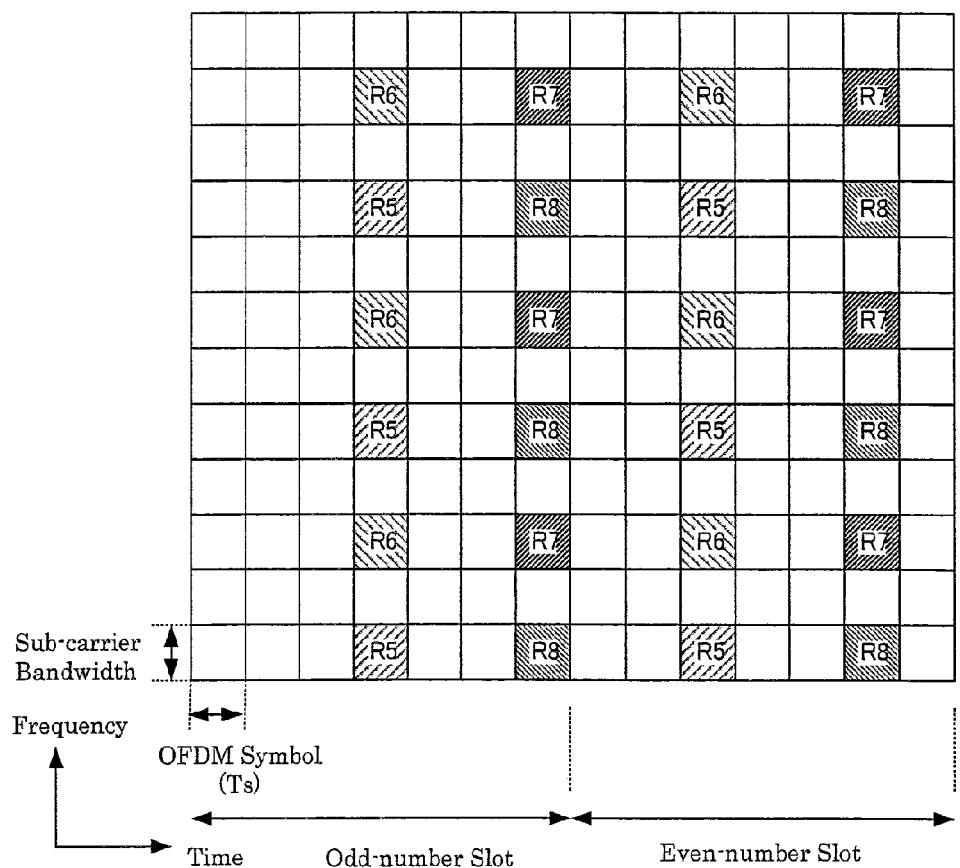
[FIG. 8] is a diagram for the third embodiment of the present invention, showing another example of positions of allocation of terminal-specific reference signals in a resource block when cooperative reception is performed.

FIG. 8 illustrates an example for the third embodiment of the present invention, in which terminal-specific reference signals of cooperative transmission cells of the base station apparatuses that perform cooperative transmission are allocated in time division, showing an example of allocation where the main transmission cell and three cooperative transmission cells are used. Here, R8 denotes the terminal-specific reference signal of the third cooperation transmission cell. The terminal-specific reference signal is assigned to 12 resource elements in each resource block pair for one transmission cell. However, since the proportion of the number of reference signals becomes greater the greater the number of base station apparatuses for cooperative transmission is, there occurs the problem that the number of resource elements to be used for transmission of downlink data is reduced. In the present embodiment, by distributing the terminal-specific reference signals of cooperative transmission cells of the base station apparatuses that perform cooperative transmission on a time division basis, reduction of the number of resource elements to be used for transmission of downlink data is alleviated. In this case, since terminal-specific reference signals for each cooperative transmission cell in the time axis direction decrease in number, the demodulation characteristic may degrade if the terminal unit moves at high speed. However, a terminal unit moving at high speed will not continue to stay in the area where the terminal can stably receive signals from a plurality of base station apparatuses, hence the terminal is unlikely to be the target of cooperative reception and will not pose any problem.

<The Fourth Embodiment>

Figure 9:
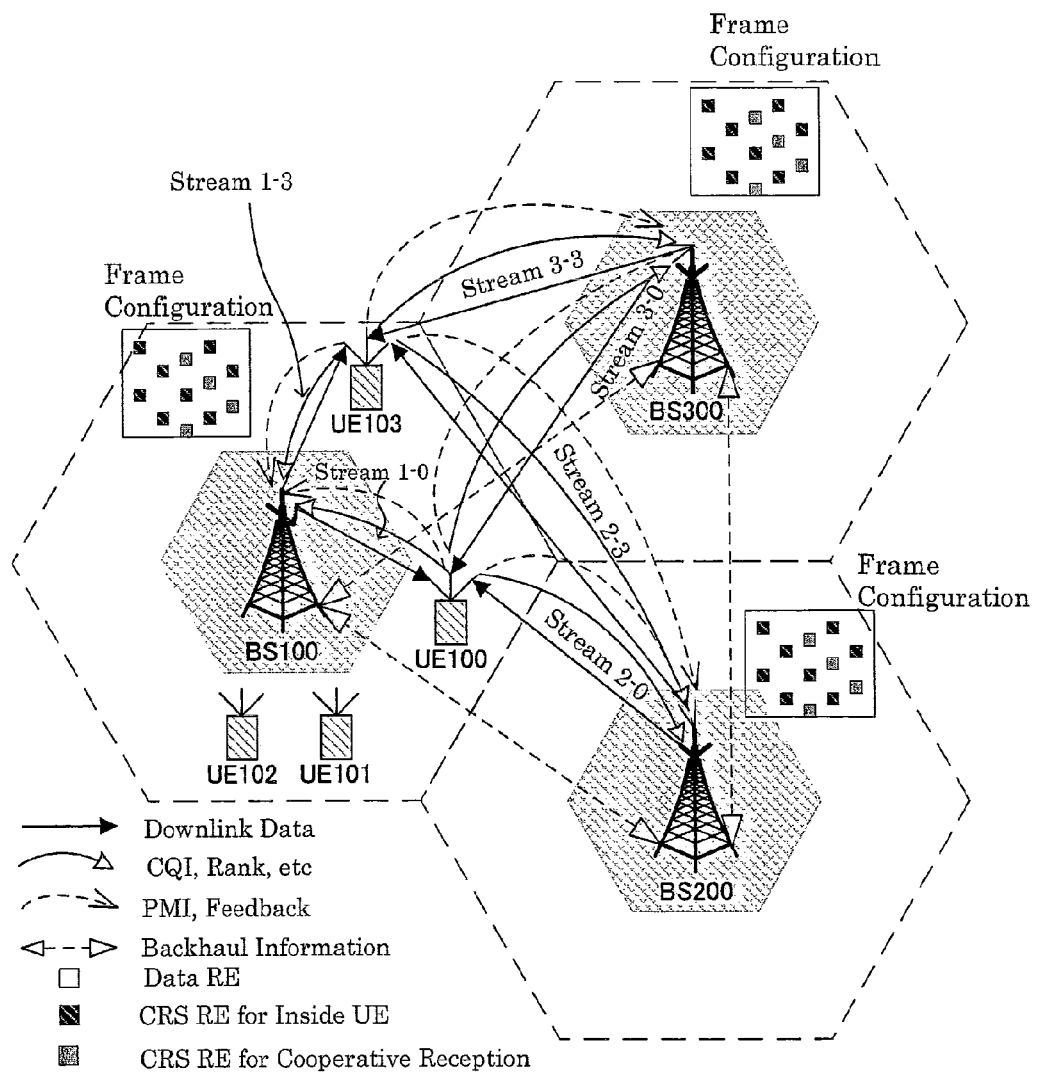
[FIG. 9] is a diagram for the fourth embodiment of the present invention, showing one example where a multiple terminal multiple input multiple output scheme (MU-MIMO) is used for transmission from base stations.
Figure 10:
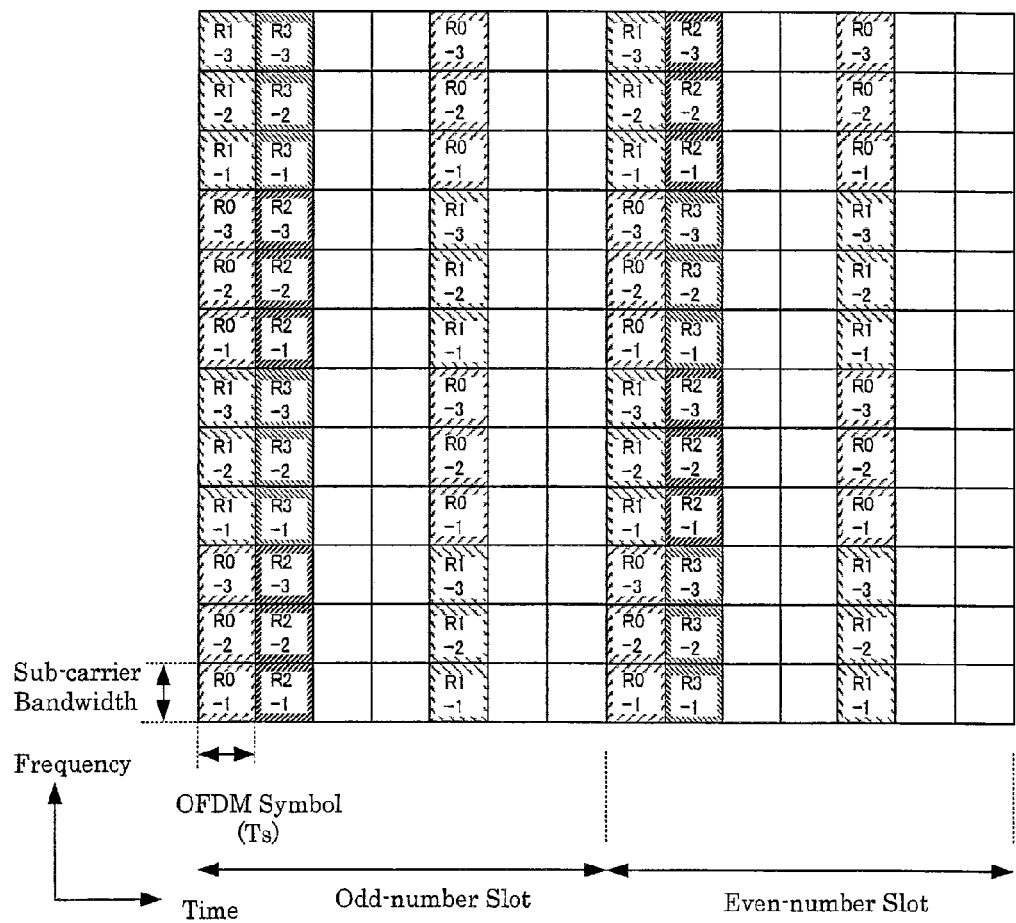
[FIG. 10] is a diagram for a conventional example, showing one example of positions of allocation of terminal-specific reference signals in a resource block when cooperative reception is performed.

FIG. 9 shows one example of a communication system for the fourth embodiment of the present invention, wherein the scheme of performing cooperative reception is implemented by multi-terminal multiple input multiple output (MU-MIMO) techniques. In the present embodiment, instead of using terminal-specific reference signals, cell-specific reference signals are used. FIG. 10 is a diagram showing one example of positions of allocation of terminal-specific reference signals in a resource block when cooperative reception is performed. Common reference signals RS0 to RS3 transmitted from each base station apparatus are used. In total, twelve kinds of common reference signals are used. The figure written next to the subscript "-" in "R0-2" in FIG. 10 indicates the base station apparatus that transmits common reference signals RS0 to RS3: "-1" indicates a common reference signal transmitted from base station apparatus 100, "-2" indicates a common reference signal transmitted from base station apparatus 200, and "-3" indicates a common reference signal transmitted from base station apparatus 300. Terminal unit UE100 communicates with BS100 as the main base station apparatus, and also receives signals from BS200 and BS300 that participate in cooperative transmission, at the same time to perform cooperative reception. Terminal unit UE103 also performs cooperative reception in the same manner.

In MU-MIMO, the weighting coefficients are determined by main transmission cell so as to generate downlink data to terminal unit UE100 and that to UE103 separately from each other, whereby the downlink data is transmitted from each transmission cell. The positions of allocation of cell-specific reference signals to resource elements are uniquely determined based on the cell identifiers, similarly to the case of the terminal-specific reference signals. In LTE, since the positions of allocation of cell-specific reference signals inside the resource block are arranged every three sub-carriers in the frequency direction, the number of cells that will not cause overlap is three at the maximum (see FIG. 10). However, it is not always certain that no overlap will occur even if the number of transmission cells is three.

In the present embodiment, when the positions of cell-specific reference signals overlap, the position of the reference signal is transferred to another transmission symbol and reference signals in part of transmission symbols are cancelled out of transmission so as to realize allocation free from overlapping. Since transmission of reference signals in part reduces the number of signals in the time axis direction, the demodulation characteristic will degrade if the terminal unit moves at high speed. However, a terminal unit moving at high speed will not continue to stay in the area where the terminal can stably receive signals from a plurality of base station apparatuses, hence the terminal is unlikely to be the target of cooperative reception and will not pose any problem.

Figure 11:
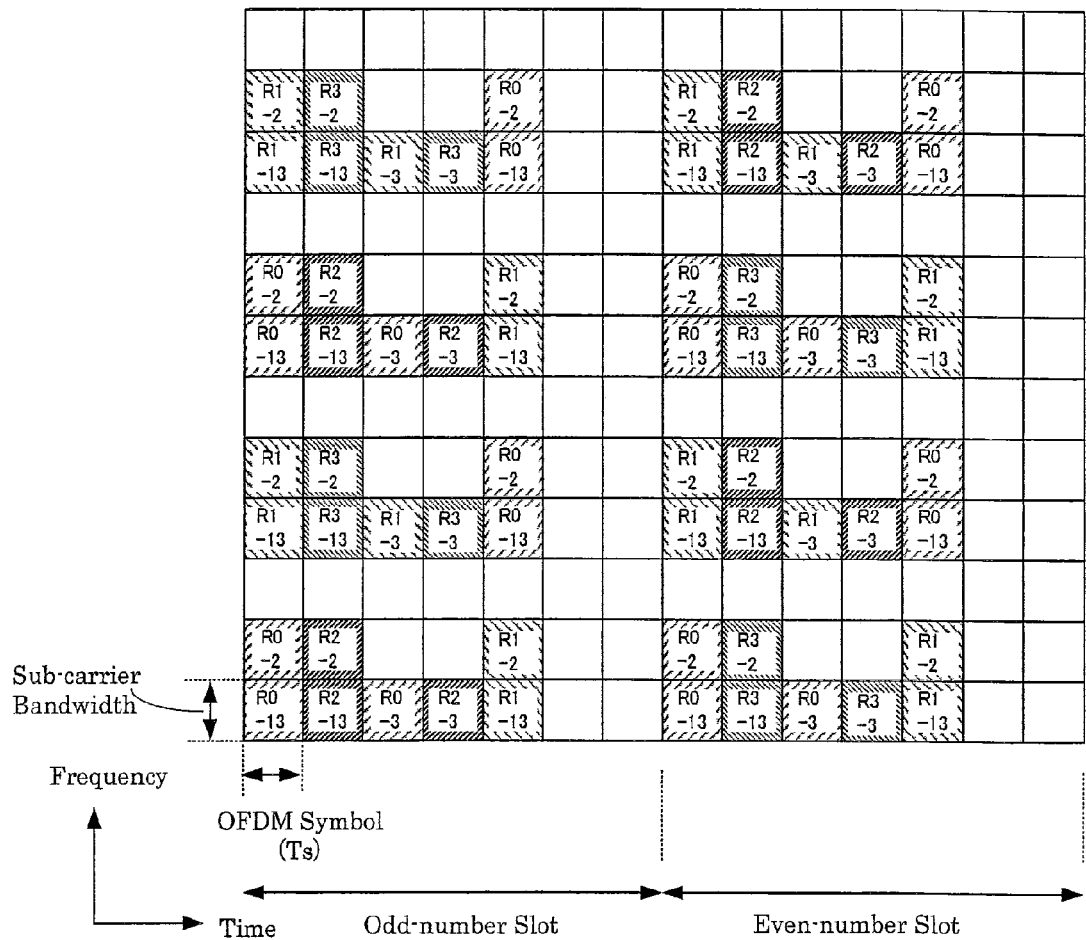
[FIG. 11] is a diagram for the fourth embodiment of the present invention, showing another example of positions of allocation of terminal-specific reference signals in a resource block when cooperative reception is performed.

FIG. 11 shows one example of allocation of cell-specific reference signals in the present embodiment. Here, a subscript "-13" represents that the position of allocation of a cell-specific reference signal of the main transmission cell of base station apparatus BS100 and the position of allocation of a cell-specific reference signal of the cooperative transmission cell of base station apparatus BS300 that is used for cooperative reception, overlap each other. A subscript "-2" represents the position of allocation of a cell-specific reference signal of the cooperative transmission cell of base station apparatus BS200 that is used for cooperative reception. A subscript "-3" represents that the cell-specific reference signal of the cooperative transmission cell of base station apparatus BS300 whose positions of allocation overlap that of the reference signal of the main transmission cell of base station apparatus BS100 is transmitted again at this position. Further, the reference signals of BS300 in the fifth and twelfth OFDM symbols will not be re-transmitted, whereby it is possible to alleviate reduction of resource elements to which downlink data can be assigned.

Here, it is possible to re-transmit the reference signals of BS300 in the fifth and twelfth OFDM symbols by using the seventh and fourteenth OFDM symbols, similarly to the other overlapping OFDM symbols. Which OFDM symbols are used to retransmit the cell-specific terminal signals is notified as part of terminal unit-individual information from main transmission cell BS100 to terminal unit UE100 and terminal unit UE103, so that terminal units can be aware of the positions of allocation.

<The Fifth Embodiment>

Figure 12:
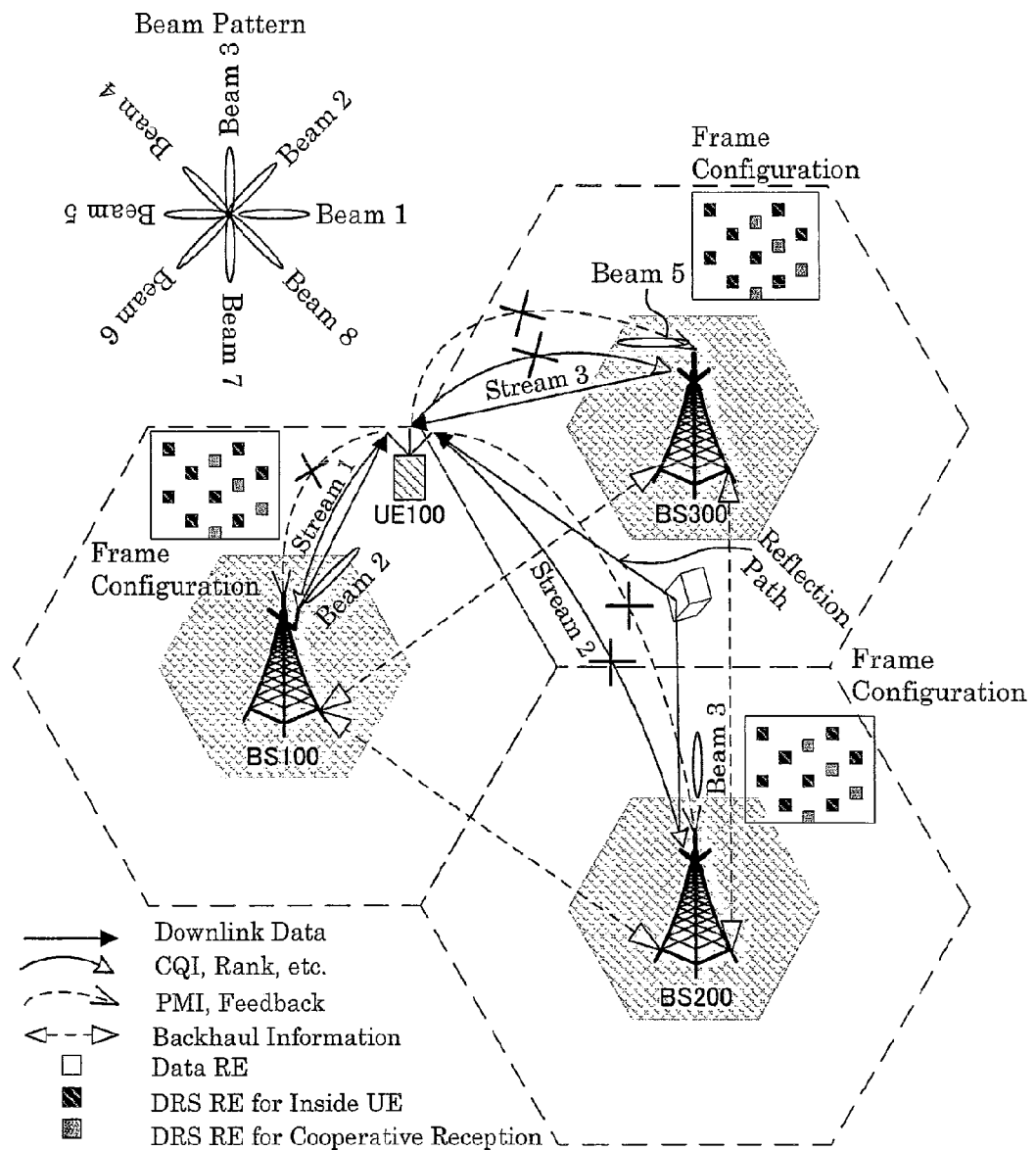
[FIG. 12] is a diagram for the fifth embodiment of the present invention, showing one example where selection of beams transmitted from base stations can be made using direction-of-arrival estimation.

FIG. 12 shows one example of a communication system as the fifth embodiment according to the present invention, in which direction-of-arrival estimation is used as the technique for cooperative reception. In selecting weighting coefficients, BS100 uses the base station apparatus that is determined based on the angle of arrival of the uplink transmission signal from the terminal unit, instead of the direction of the main transmission cell in which the terminal unit exists, which is notified via backhaul. As shown in FIG. 12, when the communication between base station apparatus BS200 and terminal unit UE100 is established mainly by a reflected path, the terminal that performs cooperative reception does not always exist in the direction toward the main transmission cell when viewed from base station apparatus BS200. In the present embodiment, since beams can be formed by selecting appropriate weight coefficients based on the angle of arrival of the uplink transmission signal, it is possible to perform cooperative reception even when the direction of the beam, as in the case of a reflected path etc., is different from that of the base station apparatus.

<The Sixth Embodiment>

Figure 13:
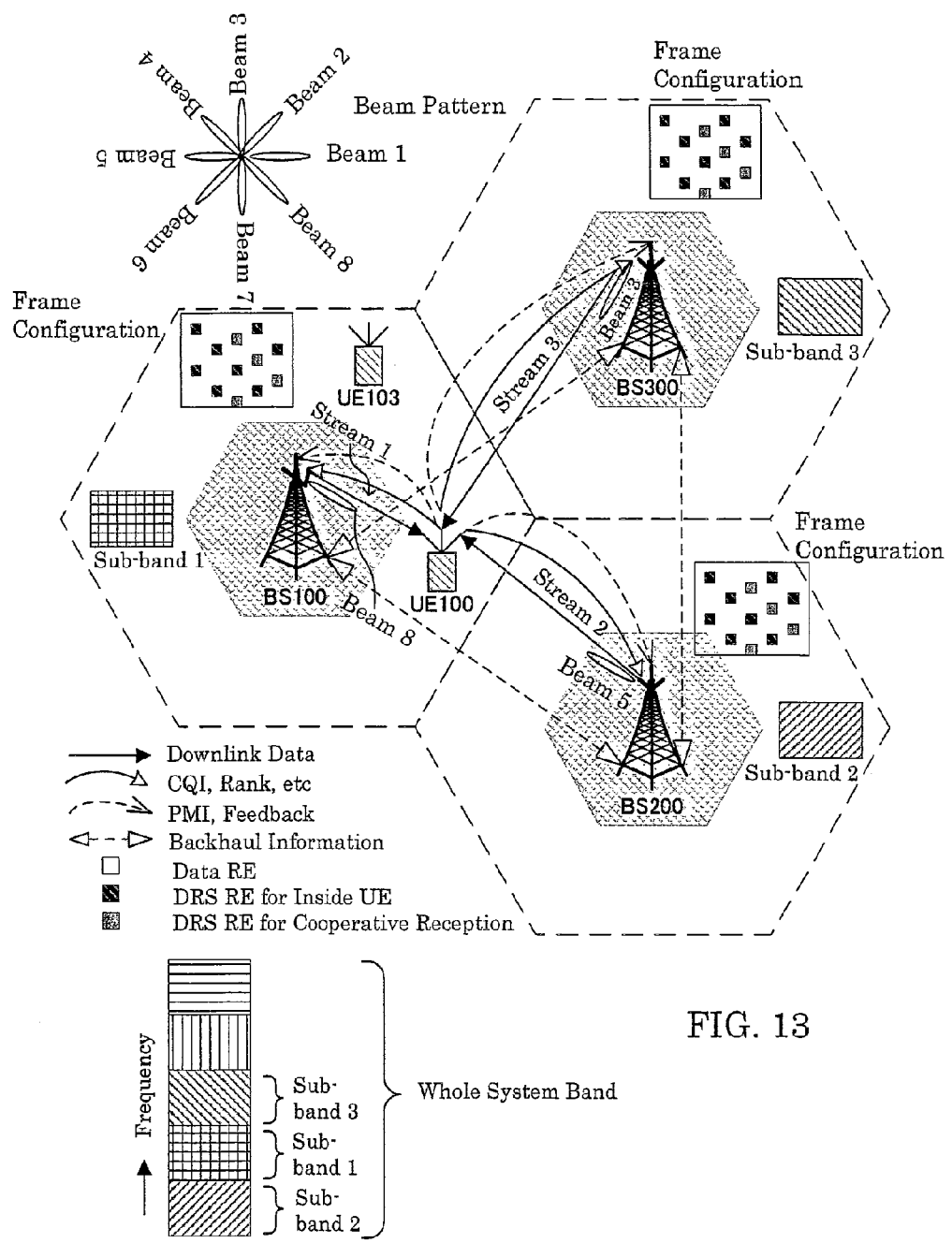
[FIG. 13] is a diagram for the sixth embodiment of the present invention, showing one example where cooperative reception is implemented in only specific frequency bands.

FIG. 13 shows one example of a communication system as the sixth embodiment according to the present invention, in which cooperative reception is implemented in only specific frequency bands. In FIG. 13, in the whole system frequency band, the frequency bands to be used for cooperative reception between cells are fixed at sub-bands 1 to 3. Sub-band 1 is the frequency band used by base station apparatus BS100, sub-band 2 is the frequency band used by base station apparatus BS200, and sub-band 3 is the frequency band used by base station apparatus BS300. In this way, the frequency bands for implementing cooperative reception are assigned individually to the cells that perform cooperative reception, whereby it is possible to prevent interference of signals between the cells for cooperative reception.

<The Seventh Embodiment>

Figure 14:
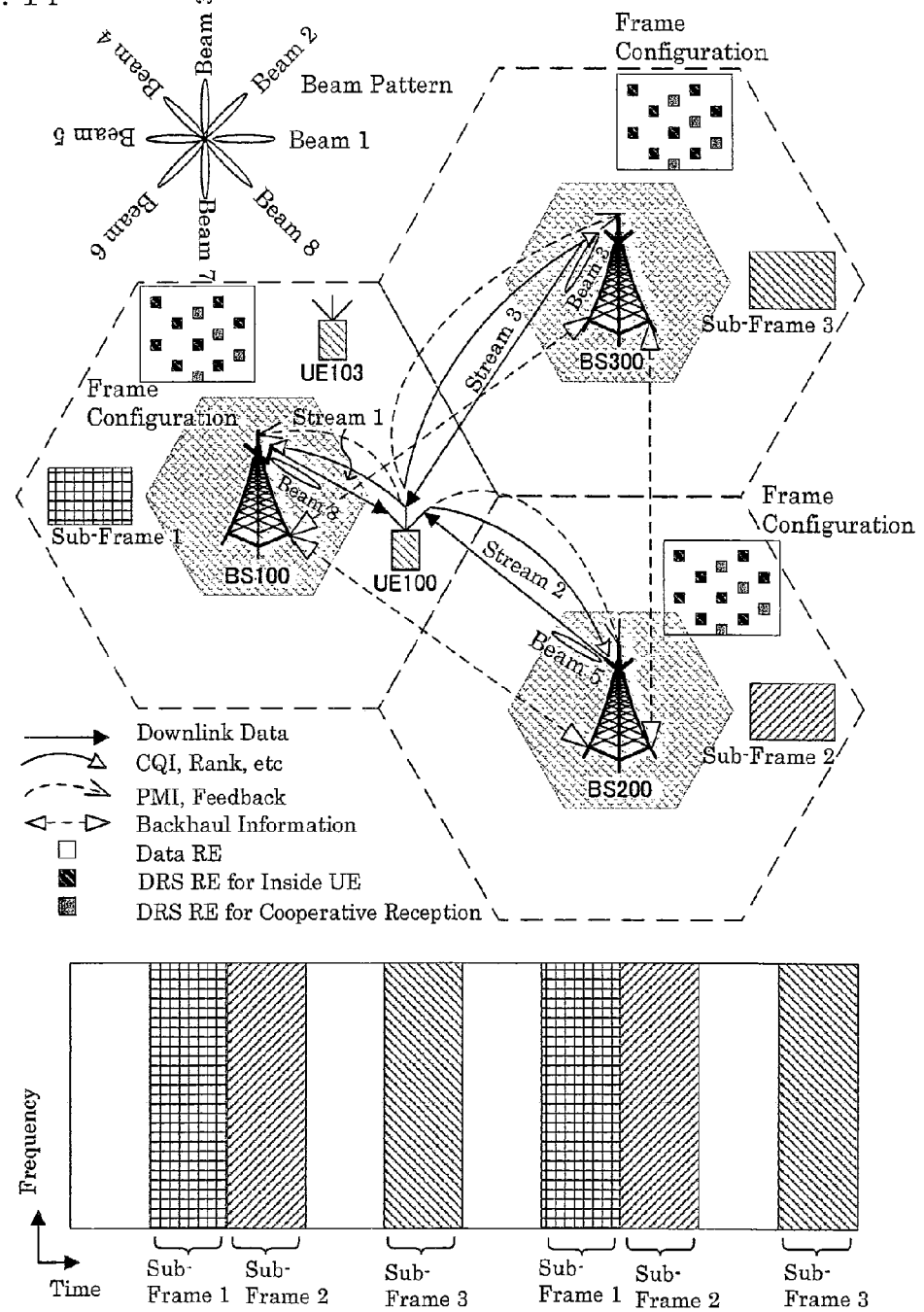
[FIG. 14] is a diagram for the seventh embodiment of the present invention, showing one example where cooperative reception is implemented in only specific time zones.

FIG. 14 shows one example of a communication system as the seventh embodiment according to the present invention, in which cooperative reception is implemented in only specific time zones. In FIG. 14, the time zones to be used for cooperative reception between cells are periodically provided as sub-frames 1 to 3. Sub-frame 1 is the time zone used by base station apparatus BS100, sub-frame 2 is the time zone used by base station apparatus BS200, and sub-frame 3 is the time zone used by base station apparatus BS300. In this way, the time zones for implementing cooperative reception are assigned individually to the cells that perform cooperative reception, whereby it is possible to prevent interference of signals between the cells for cooperative reception.

<Transmitter of Base Station Apparatus>

Figure 15:
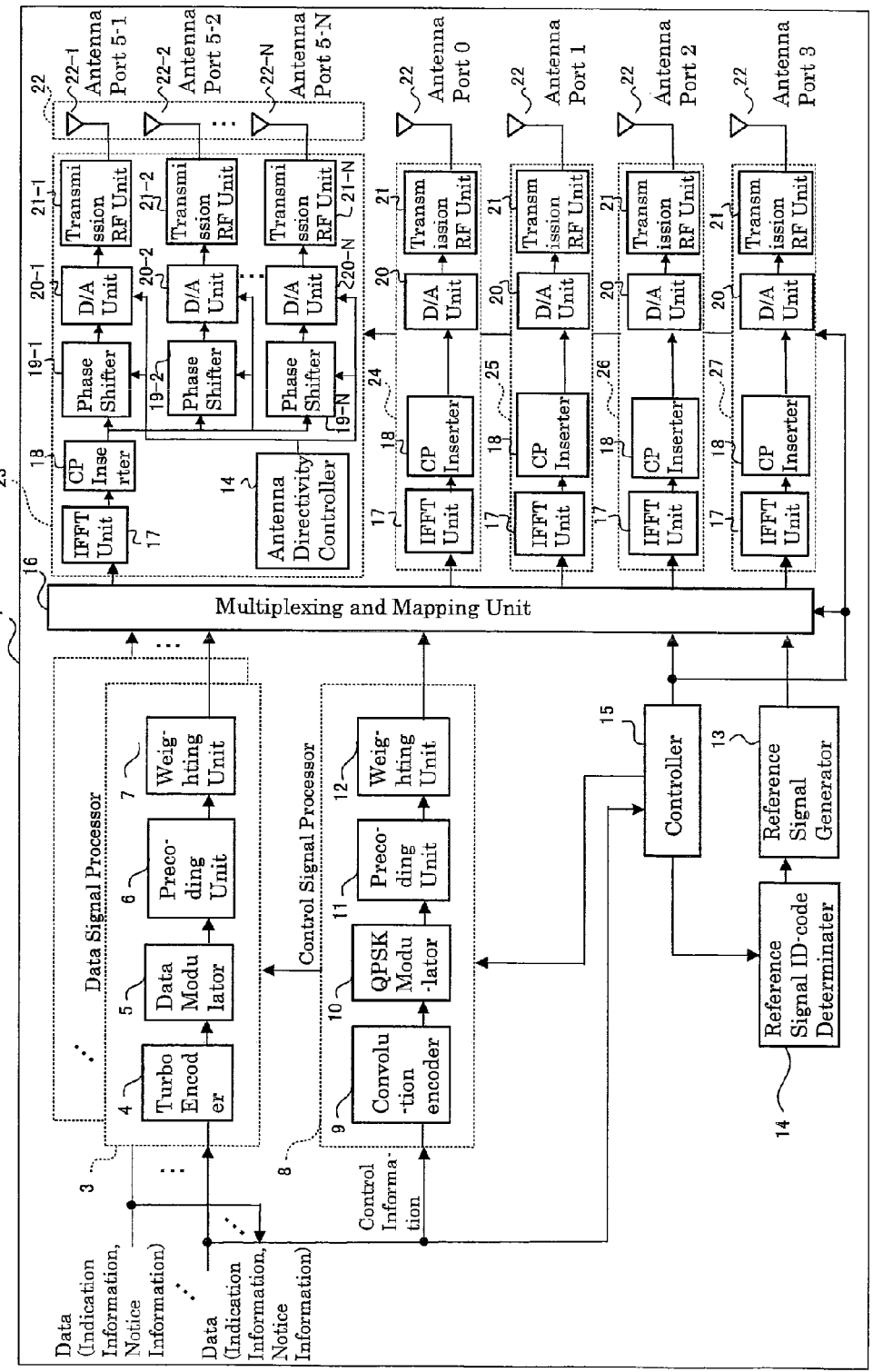
[FIG. 15] is a functional block diagram for an embodiment of the present invention, showing one configurational example of a transmitter of a base station apparatus used in a communication system that performs cooperative reception.

FIG. 15 is a functional block diagram showing one configurational example of a transmitter of the base station apparatus used in the embodiment of the present invention.

Downlink data to be transmitted is input to a transmitter 1 of the base station apparatus. Similarly, information on ID codes, and positions of allocation, of reference signals to be used by cooperative transmission cells, weighting information, scheduling information, base station-dependent information, terminal unit-specific information and the like is input to the transmitter. These pieces of information are supplied as control information to a control signal processor 8 and processed and transmitted to terminal units while part of the information (indication information, notice information) is input into a data signal processor 3 in the transmission format of downlink data, and processed to be transmitted. These signals having been input to data signal processor 3 are input to a turbo encoder 4 therein.

Turbo encoder 4 implements error correction encoding based on turbo coding for enhancing error resistance of input data, following the instructions of the coding ratio from a controller (CPU) 15. A data modulator 5 at the next stage modulates the data error-correction encoded by turbo encoder 4, by the modulation scheme selected by controller 15 from several modulation schemes such as QPSK (Quadrature Phase Shift Keying) modulation, 16 QAM (16 Quadrature Amplitude Modulation), 64 QAM (64 Quadrature Amplitude Modulation), etc. A precoding unit 6 subjects the signal modulated by data modulator 5 to phase rotation, weighting and redundantizing, etc., based on the instructions from controller 15, to thereby generate a signal for every transmitting antenna to be transmitted to each individual terminal unit.

Weighting unit 7 weights the signal from precoding unit 6 based on the instructions from controller 15 and outputs the result to multiplexing and mapping unit 16. Though weighting unit 7 may be included as part of the weighting function of precoding unit 6, a separated configuration will be described in FIG. 15.

In order to process a plurality of data series, a plurality of data signal processors 3 are provided. Each of data signal processors has identical processing content. Control information is input to convolution encoder 9 of control signal processor 8. Convolution encoder 9, following the indication of encoding ratio from controller 15, performs error correction encoding by convolution codes for enhancing the error resistance of the input information.

QPSK modulator 10 modulates the control signal that has been error correction encoded by convolution encoder 9 based on a QPSK modulation scheme. Precoding unit 11 subjects the signal modulated by QPSK modulator 10 to phase rotation, weighting and redundantizing, etc., based on the instructions from controller 15, to thereby generate a control signal to be transmitted to each terminal unit for every transmitting antenna. A weighting unit 12 weights the signal from precoding unit 11 based on the electric power defined by controller 15 and outputs the result to multiplexing and mapping unit 16. This weighting unit 12 may be included as part of the weighting function of precoding unit 11, similarly to the case of data signal processor 3.

A reference signal generator 13 generates reference signals each transmitting antenna 22 of transmitter 1 transmits by performing QPSK modulation based on the ID code designated by reference signal ID code determiner 14.

Multiplexing and mapping unit 16 determines allocation of each of transmission downlink data, control information and reference signals output from data signal processors 3, control signal processor 8 and reference signal generator 13, to resource elements in accordance with the mapping scheme given by controller 15, and generates a signal for every antenna and sends the resultant signals to OFDM transmitting sections 23 to 27 having different antennas.

Each of OFDM transmitting sections 23 to 27 (in the drawing, OFDM transmitting section 23 that performs data transmission by beam-forming, OFDM transmitting sections 24 to 27 that perform transmission of cell-specific terminal signals without performing data transmission by beam-forming) includes an IFFT (Inverse Fourier Transform) unit 17, a CP inserter 18, a D/A unit 20, a transmission RF unit 21 and a transmission antenna 22, arranged in the mentioning order from the input side. Here, in the case of OFDM transmitting section 23 that performs data transmission by beam-forming, on the downstream of D/A units there exist N sets of D/A units and transmission RF units corresponding to antennas 22-1 to 22-N used for beam-forming. Further, phase-shifters 19-1 to 19-N for shifting phase are each provided before their associated D/A unit in order to form a beam pattern for beam-forming, and controlled by an antenna directivity controller 14. The signals output from antennas 22-1 to 22-N are spatially combined and transmitted as a signal that is output from a single virtual antenna 22 having the beam pattern.

IFFT unit 17 subjects the input signal from multiplexing and mapping unit 16 to inverse fast Fourier transform and OFDM modulation. CP inserter 18 adds a cyclic prefix (CP) to the OFDM modulated signal to thereby generate a symbol based on the OFDM scheme. The cyclic prefix can be obtained by publicly known method that duplicates part of the head or end of the symbol to be transmitted. D/A unit 20 performs D/A conversion of a baseband digital signal input from CP inserter 18 into an analog signal. Transmission RF unit 21 generates intermediate frequency in-phase and quadrature components, removes frequency components unnecessary for the intermediate frequency band, converts (up-converts) the intermediate frequency signal into a high-frequency signal, removes unnecessary frequency components and amplifies the power of the signal to be output to transmitting antenna 22.

It should be noted that the actual number and configuration of OFDM transmitting units are different depending on the base station apparatus.

<Receiver of Terminal Unit>

Figure 16:
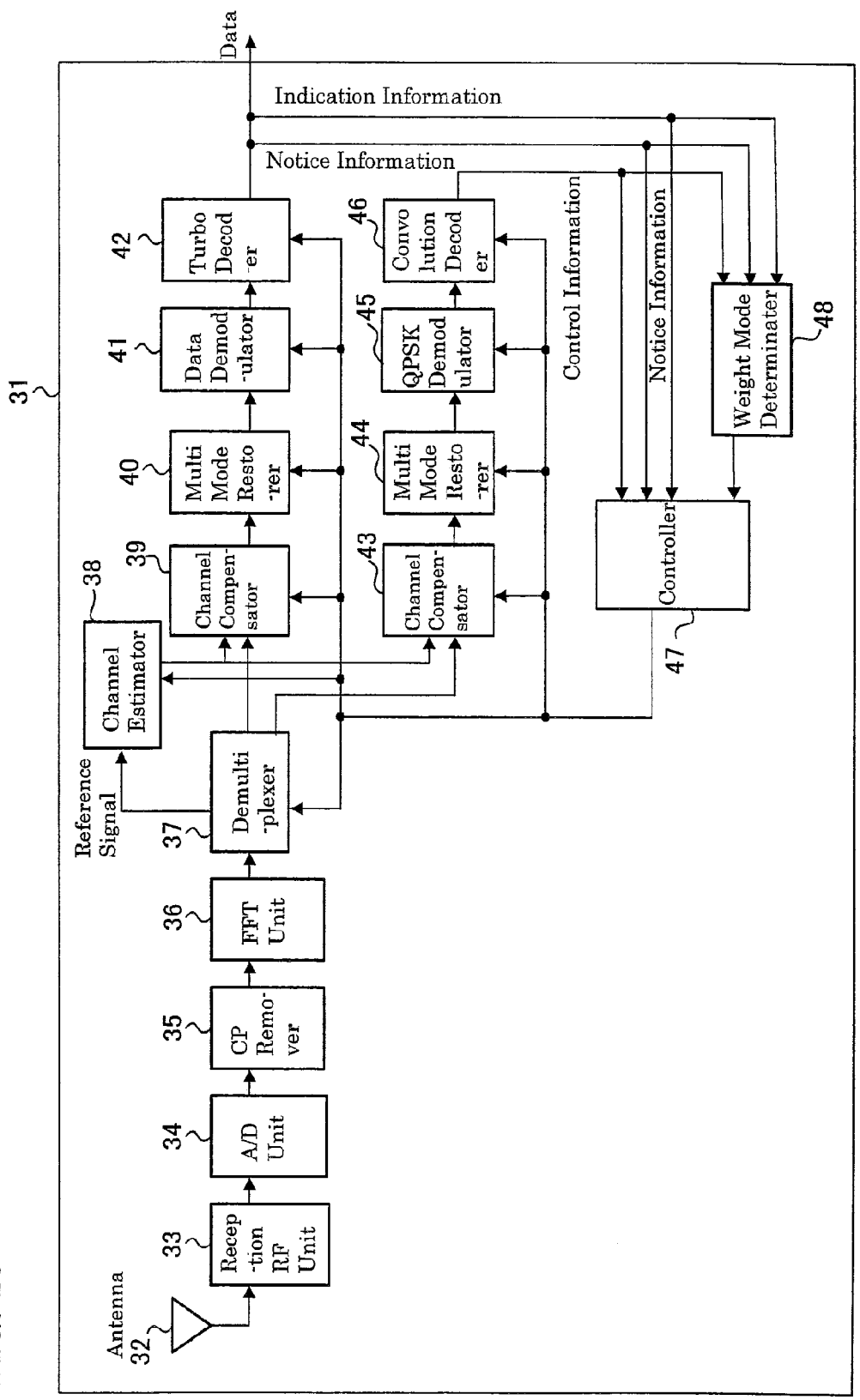
[FIG. 16] is a functional block diagram for an embodiment of the present invention, showing one configurational example of a receiver of a terminal unit used in a communication system that performs cooperative reception.
Figure 17:
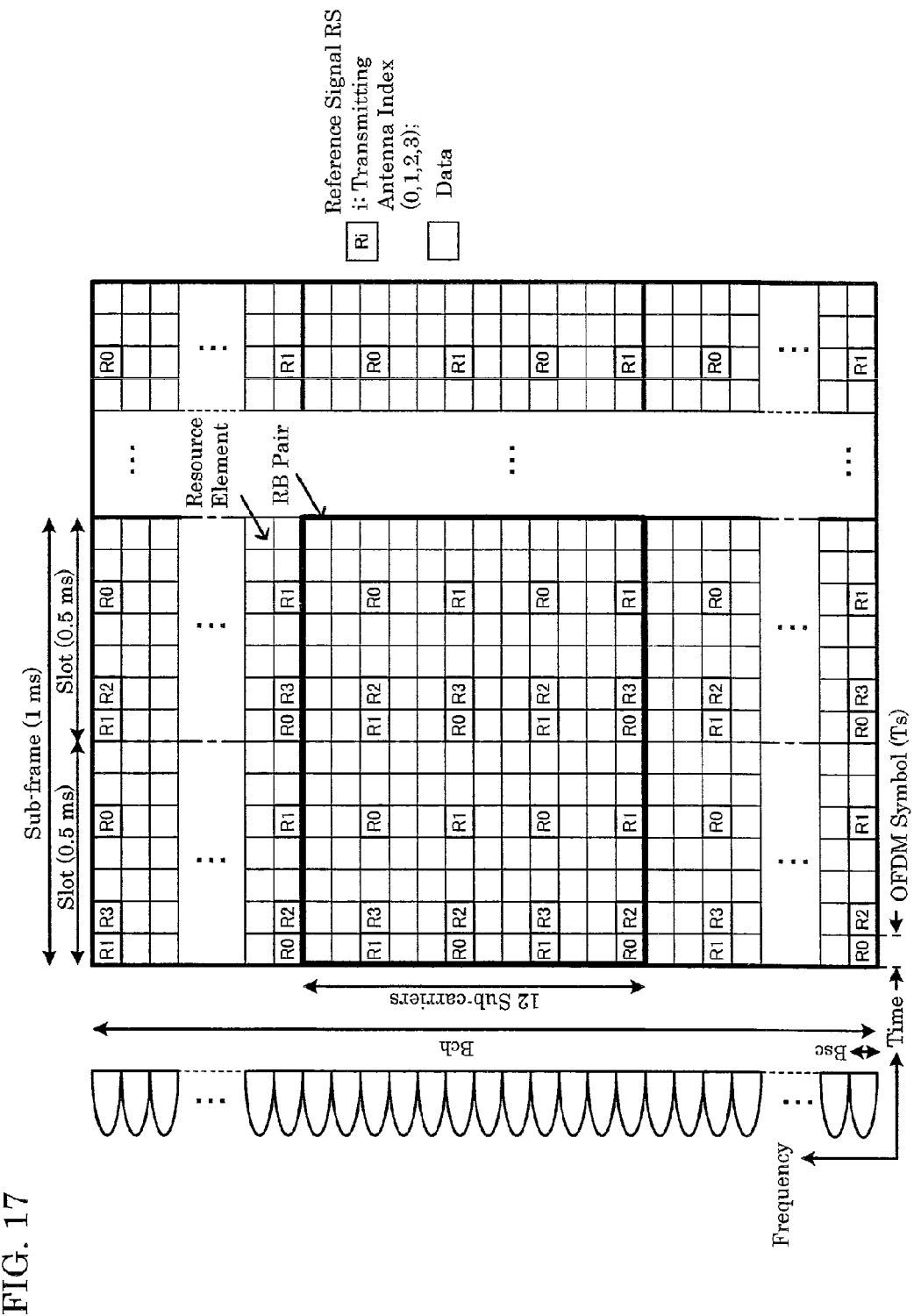
[FIG. 17] is a diagram showing an example of a downlink radio frame structure in EUTRA.
Figure 18:
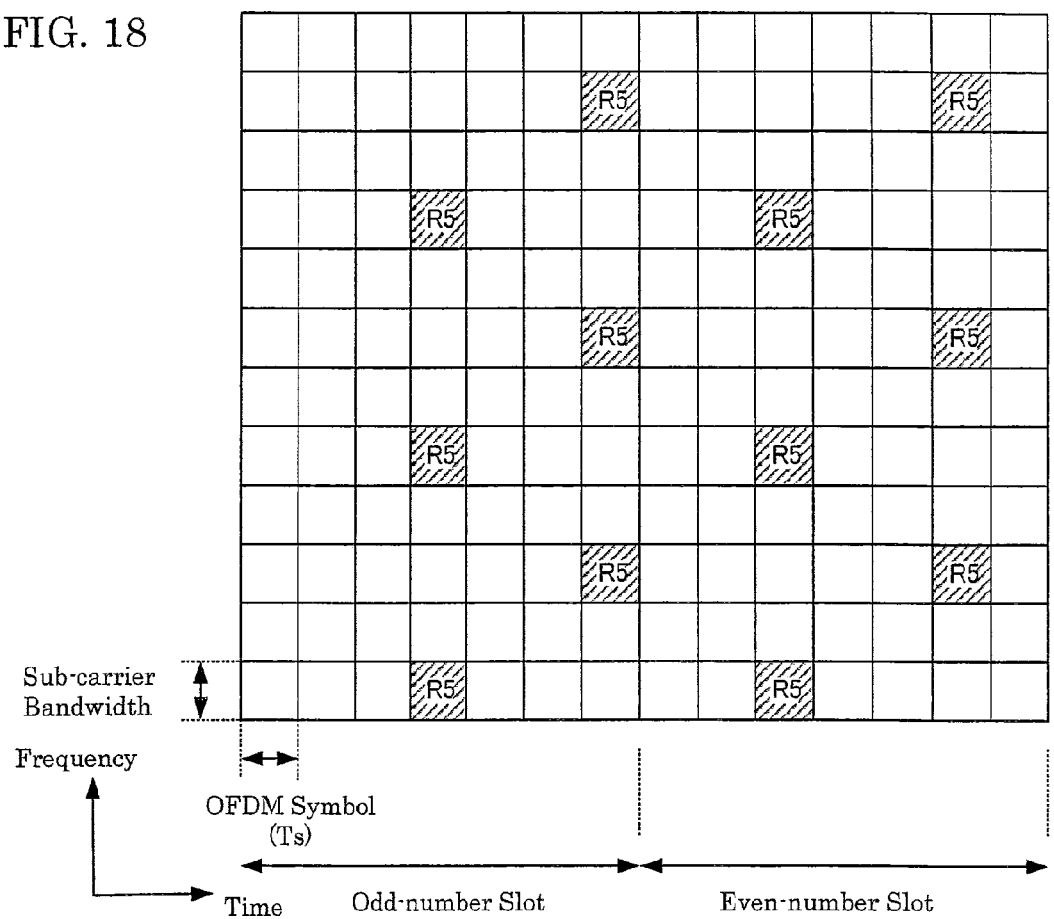
[FIG. 18] is a diagram for a conventional example, showing positions of allocation of terminal-specific reference signals in a resource block.

FIG. 16 is a functional block diagram showing one configurational example of a receiver of a terminal unit used in the embodiment according to the present invention. As shown in FIG. 16, a receiver 31 of the present embodiment include an antenna 32, a reception RF unit 33, an A/D unit 34, a CP remover 35, a FFT unit 36, a demultiplexer 37, a channel estimator 38, a channel compensator 39, a multi mode restorer 40, a data demodulator 41, a turbo decoder 42, a channel compensator 43, a multi mode restorer 44, a QPSK demodulator 45, a convolution decoder 46, a controller 47 and a weight mode determinater 48.

Reception RF unit 33 amplifies a signal received via receiving antenna 32, converts (down-convert) the signal into an intermediate frequency, removes unnecessary components, controls the amplification level so as to keep a suitable signal level and performs orthogonal demodulation based on the in-phase and quadrature components of the received signal. A/D unit 34 converts the analog signal orthogonally demodulated by reception RF unit 33 into a digital signal. CP remover 35 removes the portion corresponding to the cyclic prefix from the digital signal output from A/D unit 34. FFT unit 36 subjects the signal input from CP remover 35 to fast Fourier transform and OFDM demodulation. The section from channel compensator 39 to turbo decoder 42 is used for demodulating processing of data signals and the section from channel estimator 43 to convolution decoder 46 is used for demodulating processing of control information signals.

Demultiplexer 37, based on the instructions from controller 47, extracts reference signals from allocated resource elements, from the Fourier transformed signal through FFT unit 36, i.e., the received signal that was demodulated by OFDM and outputs the reference signals. Specifically, demultiplexer 37 extracts reference signals distributed at fixed positions and outputs the signals to channel estimator 38. Demultiplexer 37 also separates downlink data signals and control information signals.

Channel estimator 38, based on the reception result of the known reference signals separated and extracted by demultiplexer 37, estimates channel variation for each of antenna ports 0 to 3 of transmitting antennas 22 connected to OFDM transmitting units 24 to 27 of transmitter 1 and antenna ports 5-1 to 5-n of transmitting antenna 22 connected to OFDM transmitting unit 23 and outputs the channel variation compensation values. Channel compensators 39 and 43, based on the channel variation compensation values from channel estimator 38, compensates the channel variation of the input signals. For the signals compensated as to channel variation by channel compensators 39 and 43, multi-mode restorers 40 and 44, based on the multi-mode the transmitter uses, reproduce the frequency set at each antenna of the transmitted signal generated by the transmitter, taking into account the data power determined by an unillustrated signal power determinater and combine the results to generate a signal before redundantizing.

Data demodulator 41 demodulates the data signal generated by multi-mode restorer 40. This demodulation is one that is associated with the modulation scheme used at data modulator 5 of transmitter 1, and the information on the modulation scheme is given by controller 47. Turbo decoder 42 decodes the data signal demodulated by data demodulator 41. Of the decoded data, notice information, indication information are extracted and input to controller 47. The information on weighting is input to weight mode determinater 48. QPSK demodulator 45 performs QPSK demodulation of the control signal generated by multi-mode restorer 44. Convolution decoder 46 decodes the control information signal demodulated by multi-mode restorer 44. Controller 47 also analyzes the information on ID codes and positions of allocation of reference signals to be used, weighting information, scheduling information, base station-dependent information, information specific to the terminal unit and others, and controls each component of the receiver in accordance with the analyzed information.

In the above embodiment, the configurations and others illustrated in the accompanying drawings are not given for limiting purposes, but changes can be made as appropriate within the range in which the effect of the present invention can be obtained. Further, the invention can be implemented by modifying as appropriate without departing from the scope of the object of the invention. For example, description on the method of generating ID codes of reference signals and the positions of allocation of reference signals is given by using the same generating method and positions of allocation as those used when the main transmission cell does not perform cooperative reception. However, different generating method and positions of allocation from those when the main transmission cell does not perform cooperative reception may be used. Further, the application example of the present invention is given by taking a case where the cyclic prefix has a normal length as defined in Non-patent Document 1. However, the invention may be applied to other situations, for example, a case where the cyclic prefix has an extended length.

The program for realizing the functions described in the above embodiment may be recorded on a computer-readable recording medium so as to cause a computer system to read and execute the program recorded on this recording medium to thereby implement processing at each component. The "computer system" mentioned herein may and should include OS and hardware such as peripheral devices etc.

The "computer system" may and should include a web-site presented environment (displayed environment) if the www system is used.

Further, the "computer-readable recording medium" indicates a removable medium such as a flexible disk, magneto-optical disk, ROM, CD-ROM, etc., and a storage device built in a computer system such as a hard disk etc. Also, the "computer-readable recording medium" may and should include an entity that dynamically holds a program in a short period of time such as a communication line that transmits the program via a network such as the internet etc., and via a communication line such as a telephone line etc., and an entity such as a volatile memory that holds the program in a certain period of time, inside a computer system serving as a server or client. The aforementioned program may be one that implements part of the functions described above, or may be one that can implement the above-described functions in combination with a program already recorded in a computer system.

DESCRIPTION OF REFERENCE NUMERALS

BS100, BS200, BS300, BS400, BS500, BS600, BS700 base station apparatus
UE100, UE101, UE200 to UE205, UE300 to UE305 terminal unit
1 transmitter
3 data signal processor
4 turbo encoder
5 data modulator
6 precoding unit
7 weighting unit
8 control signal processor
9 convolution encoder
10 QPSK modulator
11 precoding unit
12 weighting unit
13 reference signal generator
14 reference signal ID code determinater
15 controller
16 multiplexing and mapping unit
17 IFFT unit
18 CP inserter
19 phase shifter
20 D/A unit
21 transmission RF unit
22 transmitting antenna
31 receiver
32 receiving antenna
33 reception RF unit
34 A/D unit
35 CP remover
36 FFT unit
37 demultiplexer
38 channel estimator
39 channel compensator
40 multi mode restorer
41 data demodulator
42 turbo decoder
43 channel compensator
44 multi mode restorer
45 QPSK demodulator
46 convolution decoder
47 controller
48 weight mode determinater

The invention claimed is:
1. A base station apparatus that performs main normal transmission if a communication-target terminal unit exists in the cell thereof and that can perform cooperative transmission when the communication-target terminal unit exists in another cell, the base station apparatus comprising:
- a reference signal ID code determining means that determines the ID code of a reference signal specific to the terminal unit;
- a reference signal generating means that generates the reference signal based on the determined ID code; and,
- a transmitting means that transmits a signal including the reference signal,
- wherein the reference signal generating means generates a reference signal for cooperative transmission to be used when the communication-target terminal unit exists in a cooperative transmission cell such as to be different from the reference signal for main transmission that is used by the base station apparatus for performing main transmission, and
- the transmitting means transmits the generated reference signal for cooperative transmission to the terminal.

2. The base station apparatus according to claim 1, wherein the reference signal ID code determining means generates an ID code of a reference signal for cooperative transmission by using a variable that is different from the ID code of the reference signal for main transmission of the base station apparatus that performs main transmission to the communication-target terminal unit.

3. The base station apparatus according to claim 2, wherein the reference signal ID code determining means generates an ID code of a reference signal for cooperative transmission by performing an operation using the cell ID code used by the base station apparatus of the main transmission cell and the value that is obtained by operating the intra-cell terminal identifier assigned to the terminal unit by the base station apparatus of the main transmission cell, as variables.

4. The base station apparatus according to claim 3, wherein the reference signal ID code determining means determines the difference between the value of the intra-cell terminal identifier assigned to the terminal unit by the base station apparatus of the main transmission cell and the value obtained by performing a certain operation on the intra-cell terminal identifier assigned to the terminal unit by the base station apparatus of the main transmission cell, and
- the transmitting means transmits the difference to the terminal unit.

5. The base station apparatus according to claim 2, wherein the reference signal ID code determining means uses a cell identifier of a cooperative transmission cell as the variable for generating the ID code of a reference signal for cooperative transmission.

6. The base station apparatus according to claim 2, wherein the reference signal ID code determining means uses a cell identifier that is different from the cell identifier of the main transmission cell for the communication-target terminal unit and an intra-cell terminal identifier assigned to the terminal unit by the base station apparatus of the main transmission cell, as the variables for generating an ID code of a reference signal for cooperative transmission.

7. The base station apparatus according to claim 2, wherein the reference signal ID code determining means uses a cell identifier of a connected terminal limiting cell for the communication-target terminal unit and part of intra-cell terminal identifier among intra-cell identifiers assigned to the terminal unit by the base station apparatus of the main transmission cell, as the variables for generating an ID code of a reference signal for cooperative transmission.

8. The base station apparatus according to claim 1, further comprising a weighting means that determines weighting coefficients for forming a beam directed toward the location of the base station apparatus of the main transmission cell, wherein a beam-forming scheme in which the weighting coefficients are transmitted by the transmitting means is used.

9. The base station apparatus according to claim 8, further comprising a means for estimating the direction of arrival of a signal from the terminal unit, wherein the weighting means determines weighting coefficients.

10. The base station apparatus according to claim 1, further comprising a weighting means that determines weighting coefficients for a signal from a base station apparatus, based on the cell-specific common reference signal transmitted from each base station apparatus, wherein a multi-terminal multiple input multiple output scheme in which the base station apparatus of the main transmission cell transmits the weighting coefficients determined by the weighting means to the terminal unit by the transmitting means, is used.

11. The base station apparatus according to claim 10, wherein the reference signal generating means makes the allocation of reference signals for cooperative transmission in the resource block different from the allocation of the reference signals for main transmission, and when the positions of allocation of the common reference signals overlap, the position of the overlapping reference signal of cooperative transmission cell is assigned to another transmission symbol and reference signals at part of transmission symbols will not be transmitted.

12. The base station apparatus according to claim 1, wherein the reference signal generating means makes the allocation of reference signals for cooperative transmission in the resource block different from the allocation of the reference signals for main transmission.

13. The base station apparatus according to claim 12, wherein the reference signal generating means carries out allocation of reference signals for cooperative transmission in the resource block by time-dividing the reference signal of the main transmission cell and the reference signal of the cooperative transmission cell.

14. The base station apparatus according to claim 1, wherein the transmitting means performs cooperative transmission using specific frequency bands only.

15. The base station apparatus according to claim 1, wherein the transmitting means performs cooperative transmission using specific time zones only.

16. A terminal unit that can simultaneously receive signals from a plurality of base station apparatuses and perform cooperative reception, comprising:
- a means that simultaneously receives signals from base station apparatuses according to claim 1;
- a channel estimating means that estimates channel variations based on the received reference signals to determine channel variation compensation values; and,
- a channel compensating means that compensates the channel variation of the signal from each base station apparatus, based on the channel variation compensation value.

17. A radio communication system configured of base station apparatuses according to claim 1 and a terminal unit that can simultaneously receive signals from a plurality of said base station apparatuses and perform cooperative reception, the terminal unit including:
- a means that simultaneously receives signals from said base station apparatuses;
- a channel estimating means that estimates channel variations based on the received reference signals to determine channel variation compensation values; and, a channel compensating means that compensates the channel variation of the signal from each base station apparatus, based on the channel variation compensation value, wherein the terminal unit cooperatively receives signals from the plurality of said base station apparatuses simultaneously.

18. A program that can be loaded into, and executed by, a base station apparatus that performs main normal transmission if a communication-target terminal unit exists in the cell thereof and that can perform cooperative transmission when the communication-target terminal unit exists in another cell, causing the base station apparatus to function as a reference signal ID code determining means that determines the ID code of a reference signal specific to the terminal unit;

a reference signal generating means that generates the reference signal based on the determined ID code, and, characterized in that the reference signal generating means generates a reference signal for cooperative transmission to be used when the communication-target terminal unit exists in a cooperative transmission cell such as to be different from the reference signal for main transmission that is used by the base station apparatus for performing main transmission, and a transmitting means is caused to transmit the reference signal to the terminal unit.

* * * * *